US011890730B2

(12) United States Patent
Araki et al.

(10) Patent No.: US 11,890,730 B2
(45) Date of Patent: Feb. 6, 2024

(54) POWER TOOL

(71) Applicant: MAKITA CORPORATION, Anjo (JP)

(72) Inventors: Yuta Araki, Anjo (JP); Akira Ito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/806,163

(22) Filed: Jun. 9, 2022

(65) Prior Publication Data

US 2022/0297273 A1 Sep. 22, 2022

Related U.S. Application Data

(63) Continuation of application No. 16/722,595, filed on Dec. 20, 2019, now Pat. No. 11,420,310.

(30) Foreign Application Priority Data

Jan. 10, 2019 (JP) ................................ 2019-002817

(51) Int. Cl.
*B25B 23/14* (2006.01)
*B25B 23/147* (2006.01)
(Continued)

(52) U.S. Cl.
CPC ........ *B25B 23/1475* (2013.01); *B25B 21/007* (2013.01); *B25B 21/023* (2013.01); *B25D 16/006* (2013.01); *B25D 2216/0084* (2013.01)

(58) Field of Classification Search
CPC .... B25D 2216/0084; B25D 2216/0046; B25D 16/003; B25D 16/006; B25B 21/023;
(Continued)

(56) References Cited

U.S. PATENT DOCUMENTS 5,563,482 A 10/1996 Shaw et al.
8,460,153 B2 6/2013 Rudolph et al.
(Continued)

FOREIGN PATENT DOCUMENTS

CN 1695899 A 11/2005
CN 107443321 A 12/2017
(Continued)

OTHER PUBLICATIONS

Office Action from the Japanese Patent Office dispatched Feb. 14, 2023 in related Japanese application No. 2019-44798, and machine translation thereof.

(Continued)

*Primary Examiner* — Anna K Kinsaul
*Assistant Examiner* — Himchan Song
(74) *Attorney, Agent, or Firm* — J-TEK LAW PLLC; Jeffrey D. Tekanic; Scott T. Wakeman

(57) ABSTRACT

A driver drill includes a motor housing that holds an electric motor, an axis of rotation of a rotor of the electric motor extending in a front-rear direction of the driver drill, a grip housing having an upper end connected to a lower part of the motor housing and an enlarged-part housing connected to a lower end of the grip housing and spaced from the motor housing in an up-down direction of the driver drill that is perpendicular to the front-rear direction. A torque setting of the driver drill is changeable, and the driver drill is changeable between a setting unlocked state in which the torque setting is changeable and a setting locked state in which the torque setting is not changeable.

19 Claims, 11 Drawing Sheets

(51) Int. Cl.
*B25B 21/02* (2006.01)
*B25D 16/00* (2006.01)
*B25B 21/00* (2006.01)

(58) Field of Classification Search
CPC ... B25B 21/026; B25B 21/007; B25B 23/147; B25B 23/1475
See application file for complete search history.

(56) References Cited

U.S. PATENT DOCUMENTS

| | | | |
|---|---|---|---|
| RE46,827 | E | 5/2018 | Rudolph et al. |
| 2003/0196824 | A1 | 10/2003 | Gass et al. |
| 2004/0131887 | A1 | 7/2004 | Ao et al. |
| 2005/0121209 | A1 | 6/2005 | Shimizu et al. |
| 2005/0263305 | A1 | 12/2005 | Shimizu et al. |
| 2005/0279197 | A1 | 12/2005 | Wottreng et al. |
| 2007/0084613 | A1 | 4/2007 | Zhang et al. |
| 2008/0314157 | A1 | 12/2008 | Cioto et al. |
| 2010/0089600 | A1 | 4/2010 | Borinato et al. |
| 2011/0152029 | A1 | 6/2011 | Rudolph et al. |
| 2011/0203821 | A1 | 8/2011 | Puzio et al. |
| 2012/0010043 | A1 | 1/2012 | Inagaki et al. |
| 2012/0169256 | A1* | 7/2012 | Suda .................... B25D 16/003 318/17 |
| 2013/0126202 | A1 | 5/2013 | Oomori et al. |
| 2013/0269961 | A1 | 10/2013 | Lim et al. |
| 2013/0327552 | A1 | 12/2013 | Lovelass et al. |
| 2013/0331994 | A1 | 12/2013 | Ng et al. |
| 2014/0015383 | A1 | 1/2014 | Kokinelis et al. |
| 2014/0124229 | A1 | 5/2014 | Takahashi et al. |
| 2014/0284070 | A1 | 9/2014 | Ng et al. |
| 2016/0046012 | A1 | 2/2016 | Kierspe et al. |
| 2016/0256213 | A1 | 9/2016 | Kust et al. |
| 2016/0378097 | A1 | 12/2016 | Crescenti |
| 2017/0120208 | A1 | 5/2017 | Kolar et al. |
| 2017/0136599 | A1 | 5/2017 | Aoki |
| 2017/0157753 | A1 | 6/2017 | Nagasaka |
| 2017/0326720 | A1 | 11/2017 | Kuroyanagi et al. |
| 2018/0021931 | A1 | 1/2018 | Abe et al. |
| 2018/0318999 | A1 | 11/2018 | Lovelass et al. |
| 2020/0223038 | A1 | 7/2020 | Araki et al. |
| 2021/0039231 | A1 | 2/2021 | Araki et al. |
| 2021/0078146 | A1 | 3/2021 | Araki et al. |

FOREIGN PATENT DOCUMENTS

| | | | |
|---|---|---|---|
| JP | 2004271236 | A | 9/2004 |
| JP | 2005324264 | A | 11/2005 |
| JP | 2006205274 | A | 8/2006 |
| JP | 3130851 | U | 4/2007 |
| JP | 2010149251 | A | 7/2010 |
| JP | 2011136405 | A | 7/2011 |
| JP | 2011230272 | A | 11/2011 |
| JP | 2011251356 | A | 12/2011 |
| JP | 2012030347 | A | 2/2012 |
| JP | 2012139800 | A | 7/2012 |
| JP | 2013066948 | A | 4/2013 |
| JP | 2013094864 | A | 5/2013 |
| JP | 2013255987 | A | 12/2013 |
| JP | 2014136299 | A | 7/2014 |
| JP | 2015229223 | A | 12/2015 |
| JP | 2017100259 | A | 6/2017 |
| JP | 2017127916 | A | 7/2017 |
| JP | 2019054728 | A | 4/2019 |
| WO | 2016121458 | A1 | 8/2016 |

OTHER PUBLICATIONS

Search Report from the Japanese Patent Office dated Jan. 24, 2023 in related Japanese application No. 2019-44798, and machine translation thereof.
Office Action from the Chinese Patent Office dated Apr. 12, 2023 in related application No. 202010004734.2, and machine translation thereof.
Office Action from the United States Patent Office dated Nov. 1, 2022 in related U.S. Appl. No. 17/015,812, including examined claims 1-14, 17-19, and 21-23.
Office Action from the United States Patent Office dated Oct. 25, 2022 in related U.S. Appl. No. 16/935,758, including examined claims 1-3, and 13-27.
Office Action from the Japanese Patent Office dispatched Oct. 8, 2022 in related Japanese application No. 2019-144799, and machine translation thereof.
Office Action from the Japanese Patent Office dispatched Sep. 13, 2022, in related Japanese application No. 2019-002817, and machine translation thereof.
Amendment and Response filed on May 20, 2022, in related U.S. Appl. No. 17/015,812.
Instruction Manual for Makita's Cordless Combination Hammer XRH08, XRH10 and XRH11 dated Feb. 8, 2018.
Instruction Manual for Makita's Cordless Hammer Driver Drill XPH12 dated Mar. 24, 2016.
Instruction Manual for Makita's Cordless Random Orbit Polisher XOP02 dated Dec. 26, 2018.
Interview Summary dated May 5, 2022, in related U.S. Appl. No. 17/015,812.
Office Action from the United States Patent Office dated Feb. 28, 2022 in related U.S. Appl. No. 17/015,812, Including examined claims 1-20.
English translation of Search Report dated Jun. 15, 2022 in related Japanese application No. 2019-002817.
Japanese Office Action dispatched Jun. 28, 2022 in related Japanese application No. 2019-002817, and machine translation thereof.

* cited by examiner

POWER TOOL

CROSS-REFERENCE

The present application is a continuation of U.S. Ser. No. 16/722,595, filed on Dec. 20, 2019, which claims priority to Japanese patent application serial number 2019-002817 filed on Jan. 10, 2019, the contents of which are incorporated fully herein by reference.

TECHNICAL FIELD

The present invention relates to a power tool, such as a driver-drill or a hammer driver-drill.

BACKGROUND ART

As shown in FIG. 1 of US 2017/0157753, a known hammer driver-drill comprises a manually-rotatable change ring (torque adjusting ring) 86 rearward of a drill chuck 6.

By manually rotating the change ring 86, the length of a coil spring 104, which biases an internal gear 43C forward via a flat washer 92 and pressing pins 105, in the axial direction is changed, thereby changing the biasing force of the coil spring 104 that is applied to internal gear 43C.

Therefore, when the hammer driver-drill is operated in a so-called "clutch mode" (also known as a "screwdriving mode") and the load applied to a spindle 5 exceeds the biasing force of the coil spring 104, a clutch cam of the internal gear 43C pushes the pressing pin 105 and the flat washer 92 forward, thereby causing the internal gear 43C to idle such that the spindle 5 no longer rotates. Consequently, the screwdriving is terminated upon reaching the torque value that corresponds to the rotational position of the change ring 86 (i.e. corresponding to the biasing force that the coil spring 104 is currently exerting in the axial direction).

SUMMARY OF THE INVENTION

In the above-described driver-drill, because it is necessary to change the length of the coil spring 104 in the axial direction to adjust the torque at which the screwdriving is terminated, the torque setting range is relatively narrow. Moreover, because the change ring 86 must be manually rotated with one hand, it is necessary to grasp an adjacent part of the drill chuck 6 or the tool housing 2 (either of which may be hot) with the other hand in order to set (adjust) the desired torque.

It is therefore one non-limiting object of the present teachings to disclose improved torque setting mechanisms for a power tool.

In one aspect of the present disclosure, a power tool, such as a driver-drill or hammer driver-drill, may comprise: a motor; a motor housing that holds the motor; a grip housing connected to the motor housing; an enlarged-part housing connected to the grip housing; and a dial that is provided on the enlarged-part housing such that it is rotatable about a dial shaft. The motor is controllable by the dial.

In another aspect of the present disclosure, a power tool, such as a driver-drill or hammer driver-drill, may comprise: a motor; a motor housing that holds the motor; a grip housing connected to the motor housing; a battery mount housing connected to the grip housing; and a dial that is provided on the battery mount housing such that it is rotatable about a dial shaft. A threshold, such as an output torque threshold, for stopping (cutting of the supply of current to) the motor is settable by the dial.

In another aspect of the present disclosure, the threshold is an electric-current threshold related to the torque of the motor.

In another aspect of the present disclosure, the dial shaft extends in a direction that intersects, or is perpendicular to, a direction of elongation of the grip housing.

In another aspect of the present disclosure, the dial comprises a magnet or magnets. In this case, a magnetic field sensor that detects the magnetic field(s) generated by the magnet(s) is provided.

In the above-noted aspect of the present disclosure, the magnet(s) is (are) preferably a diametrically magnetized ring magnet.

One advantageous feature of power tools according to the present teachings is it becomes easier to perform a torque setting operation, such as, for example, setting the torque at which a bit will no longer be rotated (rotation of the motor will be stopped).

DETAILED DESCRIPTION OF THE PREFERRED EMBODIMENTS

Embodiments of the present teachings and modified examples thereof are explained below, with reference the drawings.

Front, rear, up, down, left, and right in the embodiments and the modified examples are prescribed for the sake of convenience of the explanation and may change depending on at least one of either a usage state or the state of a structural member that moves, or the like.

Figure 1:
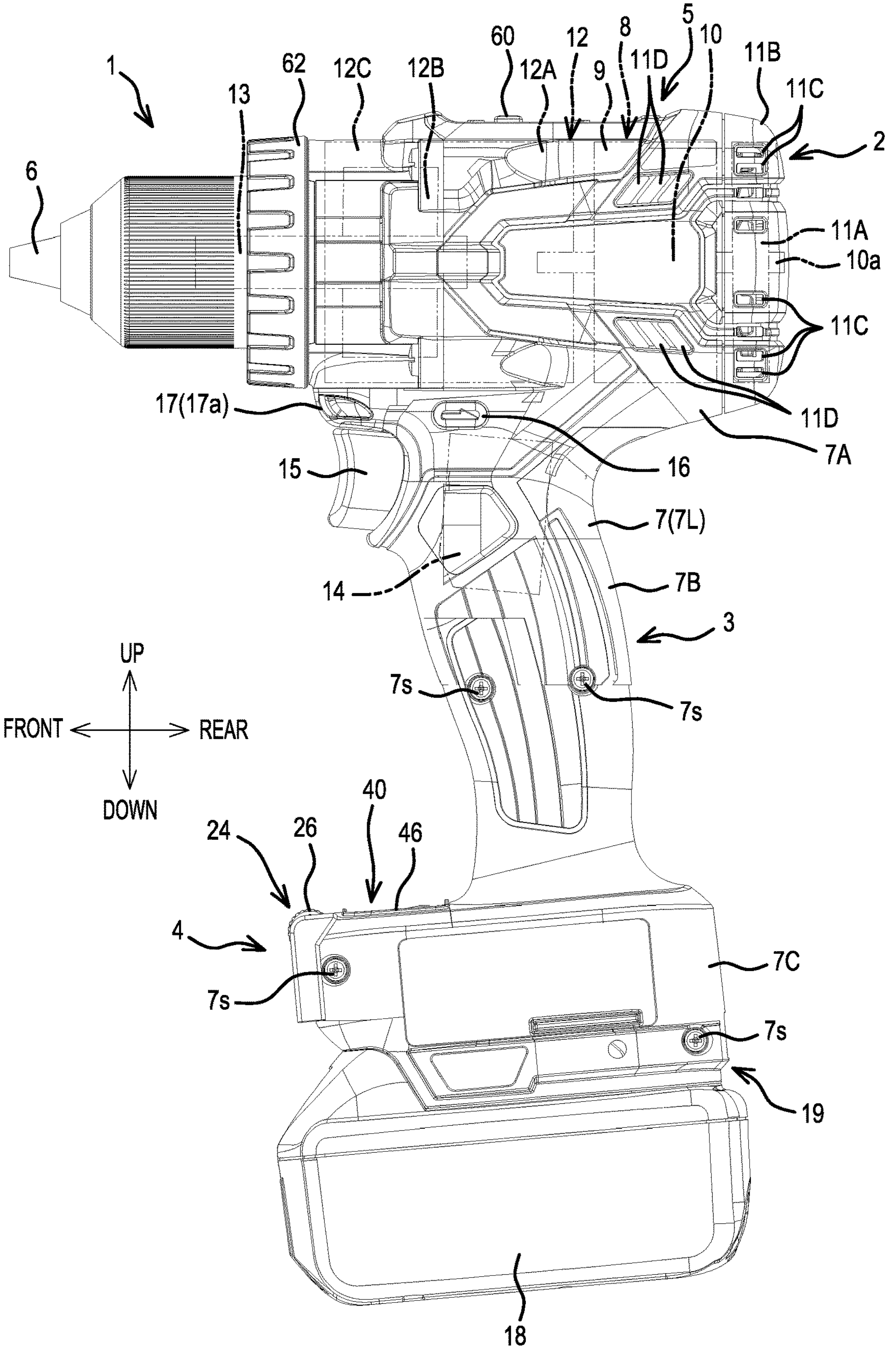
FIG. 1 is a left view of a hammer driver-drill according to one exemplary embodiment of the present teachings.
Figure 3:
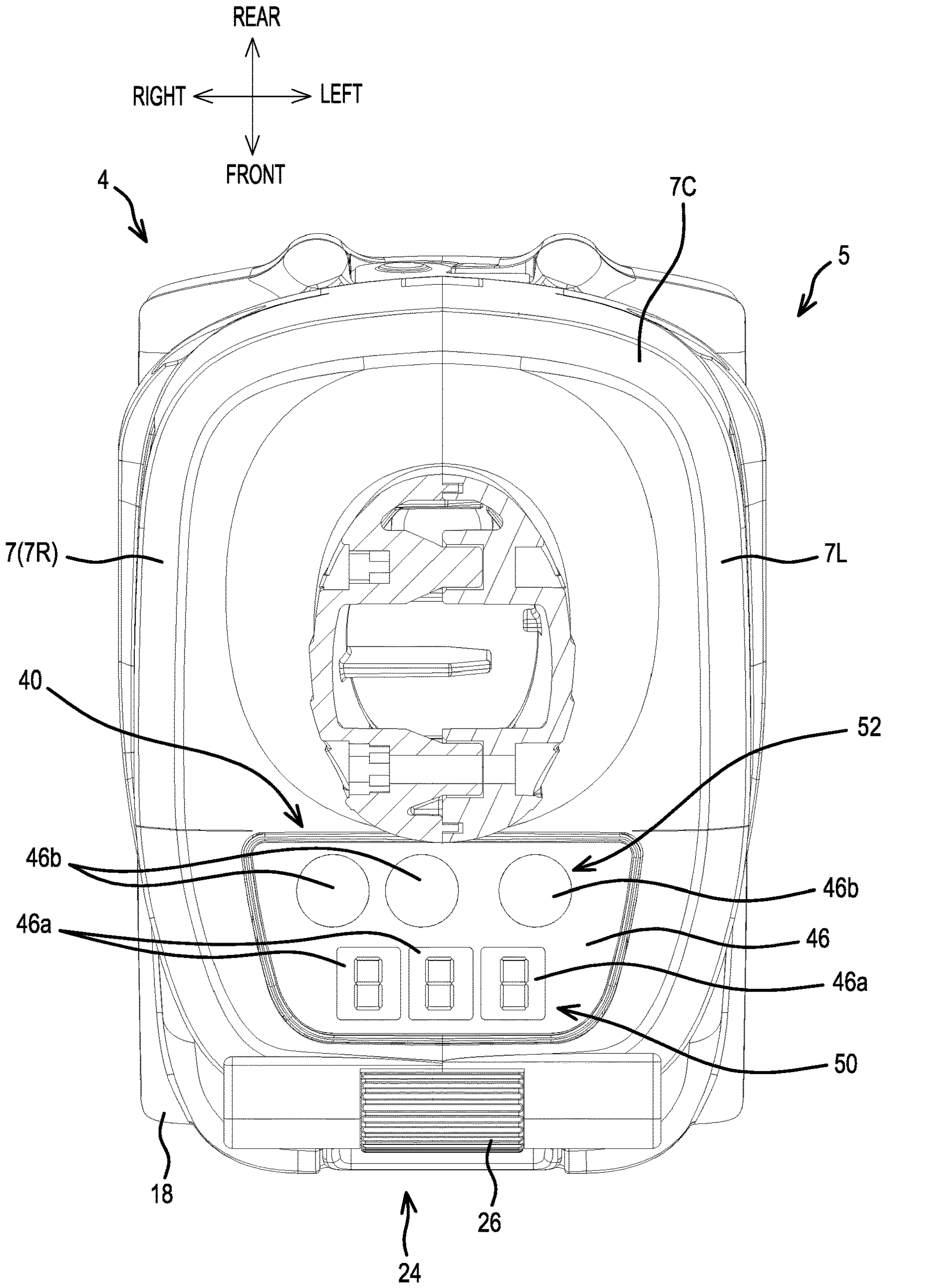
FIG. 3 is a top view of FIG. 2.
Figure 4:
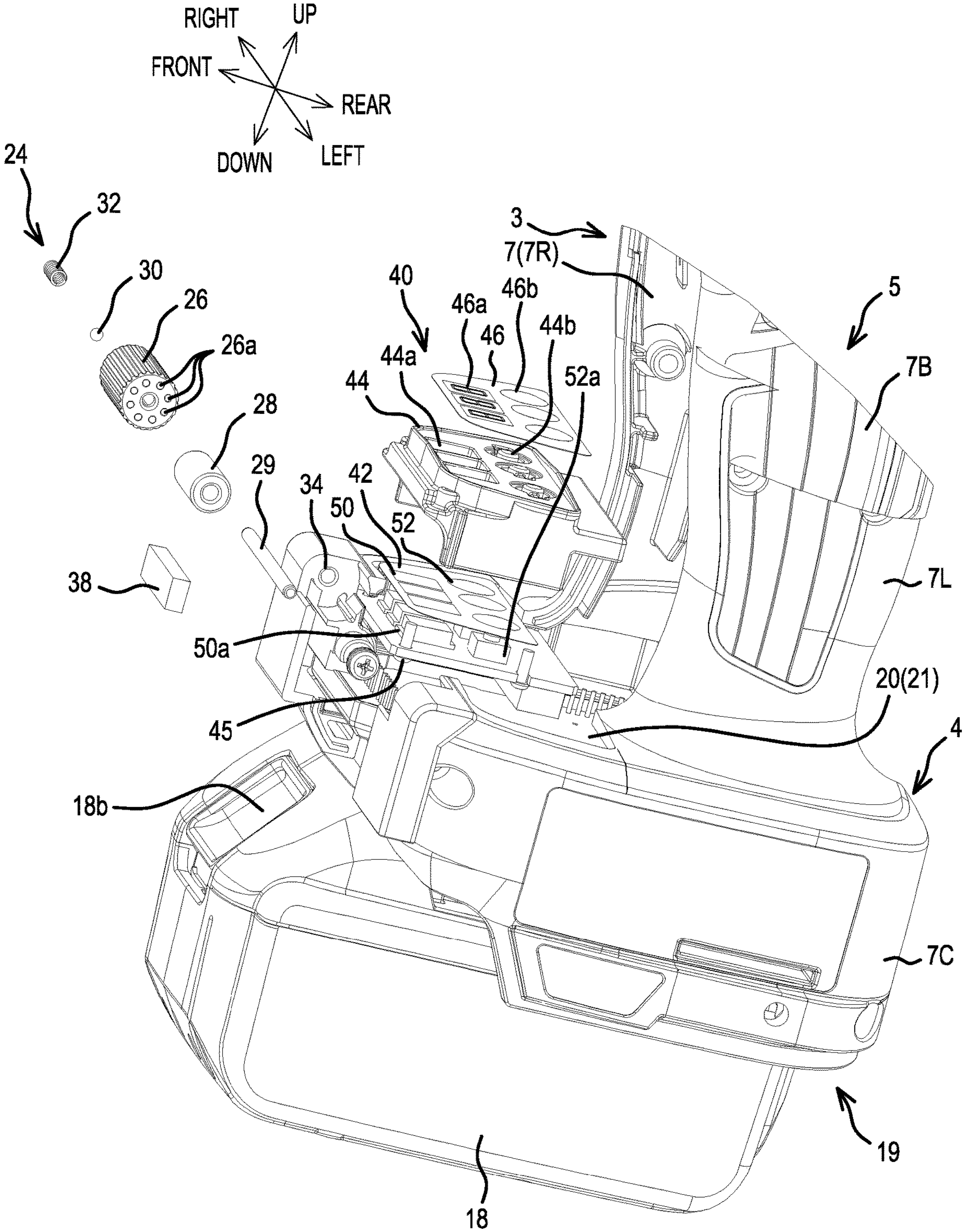
FIG. 4 is a partial, exploded, oblique view of FIG. 2.
Figure 5:
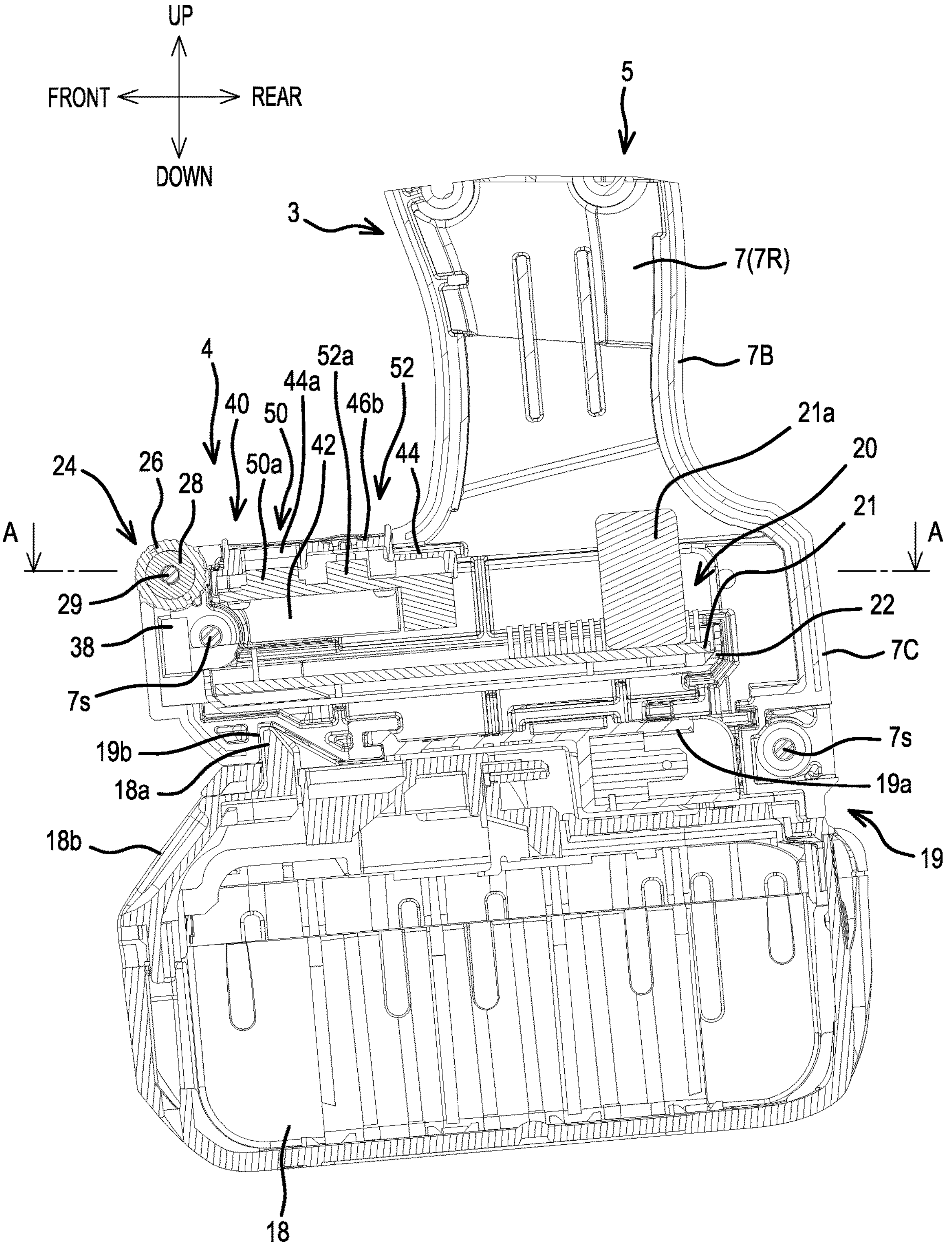
FIG. 5 is a center, longitudinal, cross-sectional view of FIG. 2.

It is noted that in FIGS. 1 and 5, left is forward of the hammer driver-drill 1; in FIG. 3 down is forward of the hammer driver-drill 1; and in FIG. 3 left is rightward of the hammer driver-drill 1.

Figure 2:
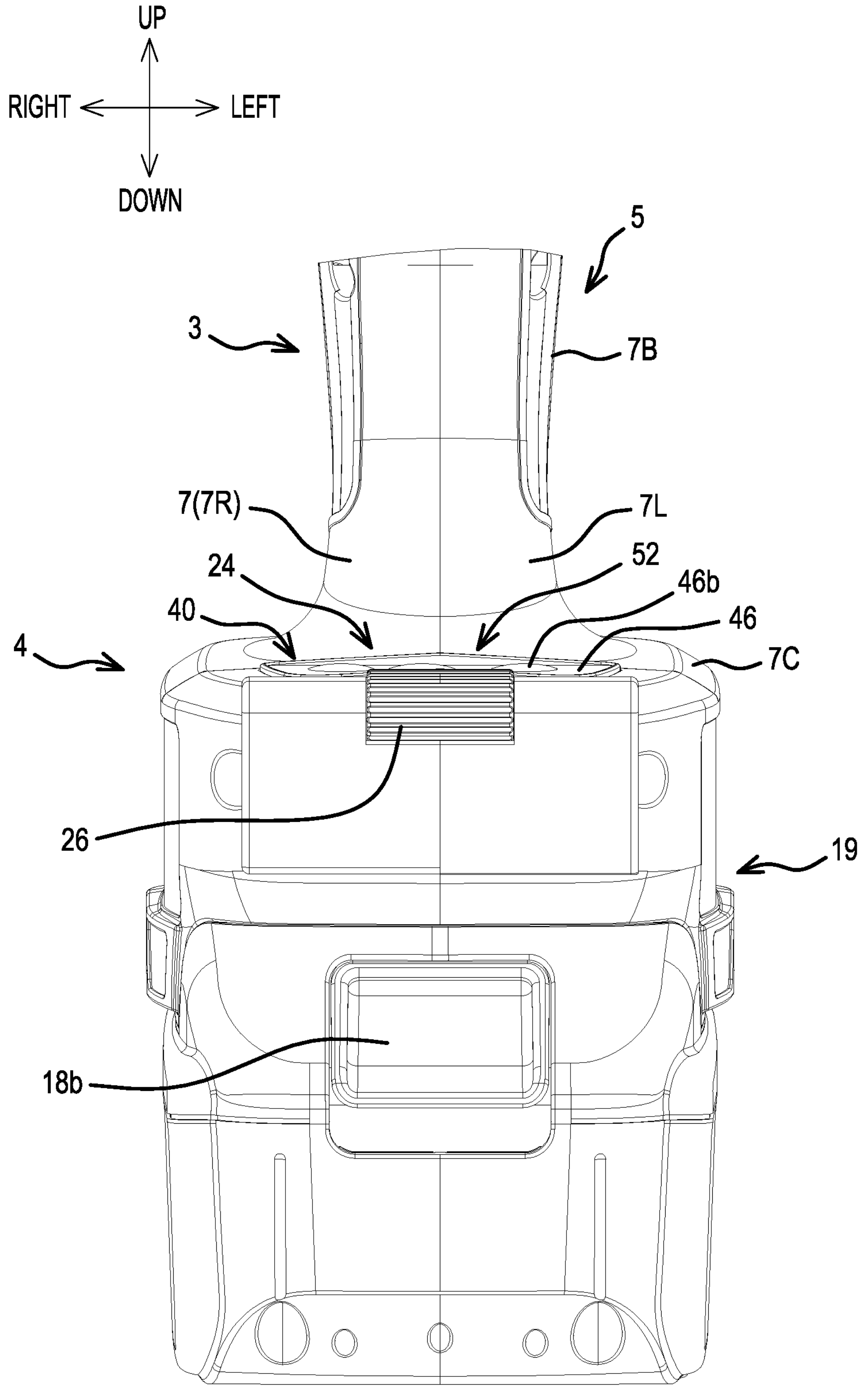
FIG. 2 is a front view of a lower-half portion in FIG. 1.

Referring now to FIGS. 1 and 2, the hammer driver-drill 1 comprises: a main-body part (main housing) 2, which has a circular-columnar shape and whose central axis is oriented in a front-rear direction; a grip part (handle) 3 formed such that it protrudes (extends) downward from a lower part of the main-body part 2; and an enlarged part (battery mount housing) 4, which is connected to a lower end of the grip part 3 and is enlarged in the frontward, rearward, leftward, and rightward directions relative to a lower-end part of the grip part 3. The outer wall portions of the main-body part 2, the grip part 3, and the enlarged part 4 altogether form a housing 5 that directly or indirectly holds a variety of internal components (parts), which are described below in connection with FIG. 12. It is noted that the enlarged part 4 may jut out from the lower-end part of the grip part 3 in any direction except in the up-down direction. For example, the enlarged part 4 may protrude only forward, it may enlarge forward, leftward, and rightward, it may protrude forward and rearward but not protrude leftward and rightward, etc. It is sufficient if the enlarged part 4 has a dimension, which is lateral (transverse, perpendicular) to a longitudinal extension of the grip part 3, that is larger or wider than a widest dimension of the grip part 3 that is lateral (transverse, perpendicular) to the longitudinal extension of the grip part 3.

A drill chuck 6 serves as a tool-accessory retaining part and is capable of holding, in its tip part, a bit (tool accessory). The drill chuck 6 is provided at a front end of the main-body part 2.

A rear housing 7 is defined as comprising a rear-half portion of the main-body part 2, which is a portion of the housing 5, and the outer walls of the grip part 3 and the enlarged part 4. The rear housing 7 is formed by joining a left-rear half (split) housing 7L and a right-rear half (split) housing 7R using a plurality of screws 7*s* oriented in the left-right direction.

One outer wall portion of the rear housing 7 (which is a rear part of the main-body part 2) acts as a motor housing 7A. A second outer-wall portion of the rear housing 7 (which is the grip part 3) acts as a grip housing 7B. A third outer-wall portion of the rear housing 7 (which is the enlarged part 4) acts as the enlarged-part housing (battery mount housing) 7C. It is noted that any two of the motor housing 7A, the grip housing 7B, and the enlarged-part housing 7C may be discrete structures (components) that are separate from one another, and are joined, e.g., by fasteners, adhesive, welding, etc.

A motor 8 is held by (in) the motor housing 7A.

Figure 12:
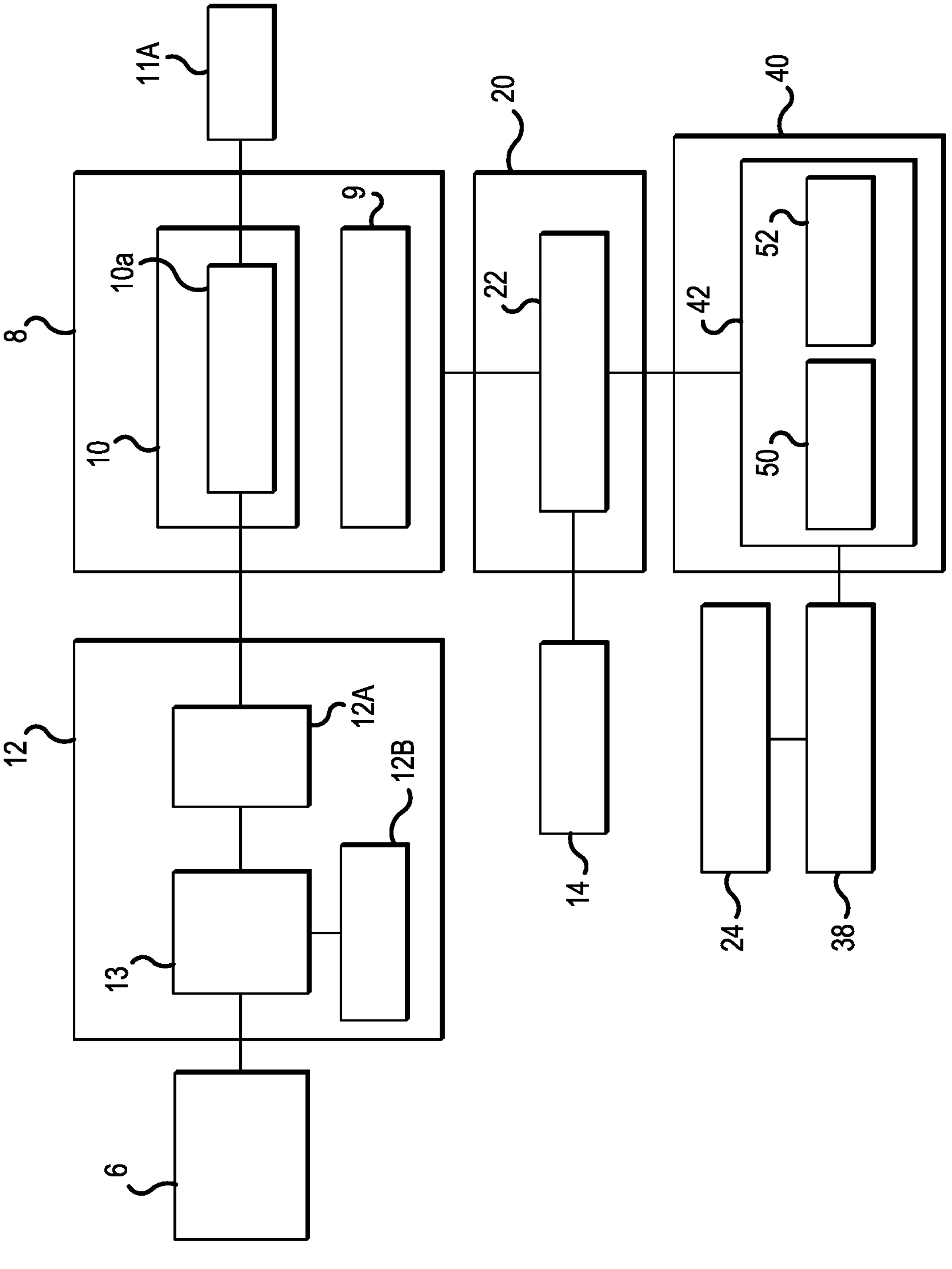
FIG. 12 is a block diagram showing the arrangement of internal structures of the hammer driver-drill shown in FIG. 1.

Referring now to FIG. 12, the motor 8 is an inner-rotor type brushless motor that comprises a stator 9 and a rotor 10. The stator 9 has a (hollow) tube shape. The rotor 10 is disposed in the (hollow) interior of the stator 9 and is rotatable relative to the stator 9. The rotor 10 comprises a motor shaft (rotary shaft) 10*a*, which rotates about its own central (rotational) axis.

A sensor circuit board (not shown) detects the rotational position of the rotor 10 and is mounted on the stator 9.

It is noted that the motor 8 may be another type of motor (i.e. other than a brushless motor), such as a brushed motor. In addition or in the alternative, the rotor 10 may be an outer-rotor type that is disposed radially outward of the stator 9.

A fan 11A (in particular, a centrifugal fan) is fixed to the rear part of the motor shaft 10*a*. It is noted that the fan 11A may be another type of fan, such as an axial-flow fan. In another alternative, the fan 11A may be disposed forward of the stator 9.

Referring now to FIGS. 1, 2 and 12 together, a rear-end part of the motor housing 7A has an opening that opens rearward, and a rear side thereof is covered by a rear cover 11B, which has a dish shape and covers the opening. The fan 11A is disposed radially inward of the rear cover 11B. Air-exhaust ports 11C respectively extend in the front-rear direction and are disposed such that the air-exhaust ports 11C are aligned in the up-down direction in a left part and a right part of the rear cover 11B.

In addition, air-suction ports 11D are provided in the left and right sides of the motor housing 7A. On the left side of the motor housing 7A, the air-suction ports 11D are disposed upward and downward, with the three upper air-suction ports 11D arranged forward and rearward and higher in the rear, and the three lower air-suction ports 11D arranged forward and rearward and higher in the front. On the right side of the motor housing 7A, the air-suction ports 11D are formed in the same manner as in the left part of the motor housing 7A. The air-suction ports 11D are disposed radially outward of the motor 8.

It is noted that the rear cover 11B may be integral with the motor housing 7A (the rear housing 7), i.e. formed without a seam therebetween. In addition, at least one of either the air-exhaust ports 11C or the air-suction ports 11D may have a shape or an arrangement other than that mentioned above, or a quantity other than that mentioned above may be utilized.

In case the fan 11A is disposed on the front side of the stator 9, the air exhaust ports 11C are preferably also disposed on the front side of the stator 9. Accordingly, the air suction ports 11D are preferably disposed rearward of the air exhaust ports in such an embodiment.

A gear assembly 12 is assembled (mounted) forward of the motor 8. The gear assembly 12 comprises a gear case 12C, which is part of the housing 5, and a spindle 13. A front-end portion of the spindle 13 is exposed forward from the front-end part of the gear case 12C. The front part of the gear case 12C and the front-end part of the spindle 13 are disposed such that they project forward from the motor housing 7A. The drill chuck 6 is mounted on the front part of the spindle 13. It is noted that the spindle 13 may be configured such that it is not a structural element of the gear assembly 12. In addition, the gear case 12C may be integral with the rear housing 7, i.e. formed without a seam therebetween.

The gear assembly 12 comprises a speed-reducing mechanism 12A, which reduces the rotational speed of the motor shaft 10*a* of the motor 8 and transmits that rotation to the spindle 13, and a hammer mechanism 12B, which hammers the spindle 13 in the axial direction when the hammer mechanism 12B is actuated (i.e. in a so-called "hammer drilling mode" of the hammer driver-drill 1 during which the drill chuck 6 is both rotated about its rotational axis and hammered (repeatedly struck) in the axial direction thereof).

A switch 14 is held within an upper portion of the grip housing 7B. The switch 14 comprises a manually actuatable (squeezable or pullable) trigger 15, which is exposed on a front side of a front-upper portion of the grip part 3. It is noted that the switch 14 may be another type, such as a button switch, a slide switch, etc.

A forward/reverse-changing button (reversing switch lever) 16, which changes the direction of rotation of the motor shaft 10*a*, is provided upward of the switch 14.

A light 17 illuminates forward of the drill chuck 6 and is provided forward of the forward/reverse-changing button

16. The light 17 includes at least one LED (not shown) inside a translucent light cover 17*a* and is oriented diagonally upward.

The forward/reverse-changing button 16 and the light 17 are held by the motor housing 7A. It is noted that at least one or both of these may be held by the grip housing 7B.

Referring now to FIGS. 3-6 and 12, a battery mount part 19 is formed (defined) on a lower part of the enlarged-part housing 7C. A battery (battery pack, battery cartridge) 18 that serves as the power supply for the motor 8, light 17, etc. is detachably mountable on (i.e. physically and electrically connectable to) the battery mount part 19 by being slid from the front. Because the enlarged-part housing 7C comprises the battery mount part 19, the enlarged-part housing 7C can also be considered to be a battery mount housing.

A terminal block 19*a*, which comprises terminals to which the mounted battery 18 is electrically connected, is held by the battery mount part 19. The battery mount part 19 has a recess 19*b*, which extends upward relative to adjacent portions. The battery 18 comprises a battery button 18*b* that is coupled to (is integral with) a battery tab 18*a*, which is biased upward by an elastic member (not shown), such as a spring. To lock (latch) the battery 18 on the battery mount part 19, the battery tab 18*a* enters and engages in the recess 19*b* of the battery mount part 19. To remove the battery 18 from the battery mount part 19, the battery button 18*b* is pressed downward to withdraw the battery tab 18*a* from the recess 19*b*, so that the battery 18 can be slid forward.

In addition, a controller 20, which controls the motor 8, is held in the enlarged-part housing 7C. The controller 20 comprises: a control circuit board 21 on which a microcontroller (e.g., a microprocessor), six switching devices, a capacitor 21*a*, and the like are installed. A controller case 22 covers the lower side, the front, the rear, the left, and the right of the control circuit board 21. The control circuit board 21 is electrically connected, by lead wires (not shown), to the switch 14, the stator 9 (i.e. to a plurality of coils wound on the stator 9) of the motor 8, the terminal block 19*a* and the sensor circuit board.

Furthermore, a dial 24 is provided at the front-upper part of the enlarged-part housing 7C.

The dial 24 comprises: a dial cover 26, which has a circular-cylindrical shape and ridges for preventing slippage formed on its outer circumference; permanent magnets 28, which have a circular-cylindrical shape overall and are held radially inward of the dial cover 26; a dial shaft 29, which extends (is oriented in) the left-right direction and passes through a center hole of the permanent magnets 28; a ball 30; and a coil spring 32 (elastic member) that biases (urges) the ball 30 from left side (toward the below-described hollows 26*a*).

A right end of the dial cover 26 is open such that the permanent magnets 28 can be passed (inserted) therethrough and disposed in the interior of the dial cover 26. The dial cover 26 and the permanent magnets 28 are then fixed each other. On the other side, a left-surface part is formed on a left end of the dial cover 26 so as to close up the dial cover 26, except for a hole, through which the dial shaft 29 passes. Two or more (e.g., eight) hollows (depressions) 26*a* are arranged in a circumferential direction (concentrically) on a left surface of the left-surface part of the dial cover 26. The size of each hollow (depression) 26*a* corresponds to the ball 30, i.e. each hollow (depression) 26*a* has a spherical cap shape that at least generally corresponds (conforms) to the shape of the spherical ball 30.

As shown in FIG. 7, the polarities of the permanent magnets 28 alternate in the circumferential direction (i.e. a diametrically magnetized ring magnet is formed). In the present embodiment, the polarities are arranged in the circumferential direction in the order of N pole, S pole, N pole, and S pole.

The dial cover 26 and the permanent magnets 28 are integrally rotatable in both directions (clockwise and counterclockwise when viewed from the left) about the dial shaft 29. Left- and right-end parts of the dial shaft 29 are inserted into (and rotatably supported by) boss holes 34, which are formed (defined) in left- and right-inner surfaces of the enlarged-part housing 7C.

Figure 6:
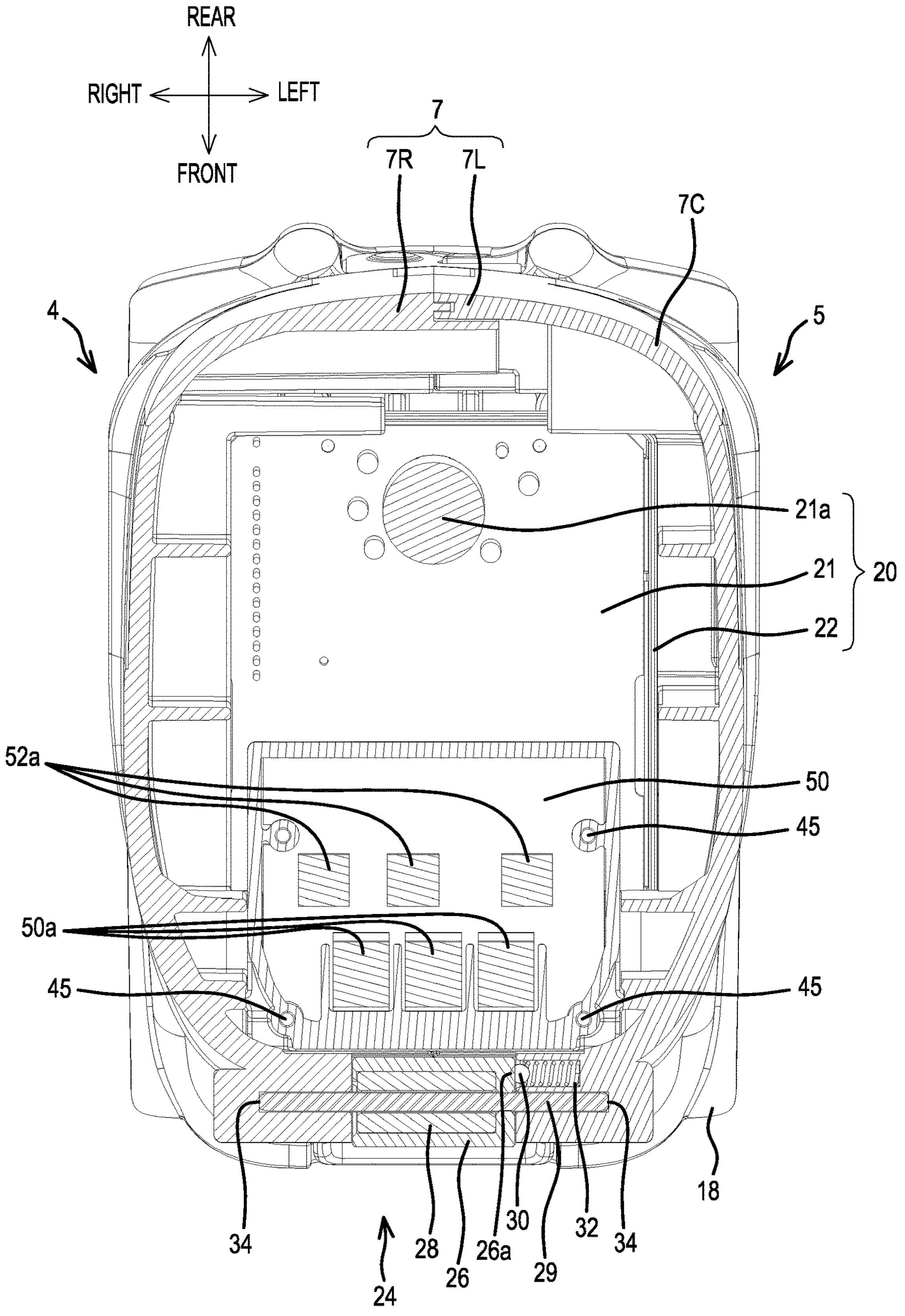
FIG. 6 is a cross-sectional view taken along line A-A in FIG. 2.

As can be seen in FIG. 6, because the biasing force of the spring 32 presses the ball 30 rightward toward the left-surface part of the dial cover 26, the ball 30 is pressed to drop into the closest one of the hollows 26*a*. When the dial cover 26 rotates, each time the ball 30 drops into corresponding one of the hollows 26*a*, the ball 30 generates a click sensation. Therefore, the user will hear and feel the finger click sound/sensation while manually rotating the dial cover 26. When the user stops manually rotating the dial cover 26, the ball 30 holds the rotational position (rotational orientation) of the dial cover 26 and the permanent magnets 28. Owing to the eight hollows 26*a*, the dial cover 26 and the permanent magnets 28 can be held at rotational intervals of 45°.

It is noted that one of the dial cover 26, the ball 30, and the spring 32 may be omitted in alternate embodiments of the present teachings. In addition or in the alternative, the dial shaft 29 may extend in a direction other than the left-right direction, such as the front-rear direction. The permanent magnets 28 and the dial shaft 29 optionally may be integral. The dial 24 optionally may be provided on a side part of the enlarged-part housing 7C or another location. The permanent magnets 28 may include only one pair of poles or may include three or more pairs of poles, instead of the two pairs of poles in the above-described embodiment. In addition or in the alternative, there may be seven or fewer of the hollows 26*a*, or there may be nine or more of the hollows 26*a*. In another alternate, the ball 30 may be replaced with another type of detent mechanism (e.g., a pin) that holds the rotational position of the dial 24 relative to the enlarged-part housing 7C.

In addition, a magnetic field sensor 38 is held downward of the dial 24 within the enlarged-part housing 7C. The dial 24 is exposed on the exterior of the enlarged-part housing 7C at the front-upper part of the enlarged-part housing 7C. The magnetic field sensor 38 is held inside a front-center part of the enlarged-part housing 7C and is not exposed.

The magnetic field sensor 38 detects the magnetic fields of the permanent magnets 28 of the dial 24 and preferably may comprise a Hall-effect device (e.g., a Hall IC). In greater detail, the magnetic field sensor 38 is capable of detecting: the magnitude and orientation of the magnetic field (i.e. the longitudinal magnetic field) in a direction perpendicular to itself (here, the front-rear direction); and the magnitude and orientation of the magnetic field (i.e. the transverse magnetic field) in the direction along (parallel to) itself (here, the up-down direction).

A torque threshold-setting interface and display 40 is provided upward of the controller 20 and rearward of the dial 24 in the enlarged part 4. The torque threshold-setting interface and display 40 comprises: a torque threshold-setting interface board (circuit board) 42; a torque threshold display cover 44 disposed on an upper side thereof; a plurality of (four) screws 45 that fasten the torque threshold-setting interface board 42 to the torque threshold display cover 44; and a torque threshold display seal (transparent window) 46.

The torque threshold-setting interface board 42 is electrically connected to the controller 20 (the control circuit board 21) by lead wires (not shown). In addition, the magnetic field sensor 38 is electrically connected to the torque threshold-setting interface board 42 by lead wires (not shown). It is noted that at least one of the magnetic field sensor 38 and the torque threshold-setting interface board 42 may be installed on (integrated with) the controller 20, so that either the contacts of the magnetic field sensor 38 and/or the torque threshold-setting interface board 42 are directly soldered onto contacts of the control circuit board 21 or a wired (printed conductive path/track) connection is made therebetween.

The torque threshold-setting interface board 42 comprises a display part 50, manually operable parts 52, and a torque threshold-setting interface control part (e.g., a CPU), which is not shown.

The display part 50 displays the currently-set torque threshold value (e.g., a number between 1-40, as will be further explained below) and the torque threshold-setting state (e.g., locked or unlocked, as will be further explained below). In the present embodiment, the display part 50 comprises a plurality of (e.g., three) 7-segment display devices 50*a*, which may be composed, e.g., of LEDs or LCDs. It is noted that the display part 50 may comprise, in addition or in the alternative, another type of display device, such as a flat-panel display (e.g., a liquid crystal display or LCD) and/or one or more lamps. In addition or in the alternative, the display and/or the manually operable parts may be provided on a touchscreen LCD.

The manually operable parts 52 are used (configured) to change the currently-set torque threshold value and the torque threshold-setting state. In the present embodiment, the manually operable parts 52 comprise a plurality of (e.g., three) button switches 52*a*. It is noted that the manually operable parts 52 may comprise two or fewer or four or more of the button switches 52*a*, and/or another type of switch, such as a slide switch, may be used instead or in addition to one or more of the button switches 52*a*.

The torque threshold display cover 44 comprises: holes 44*a*, which are oriented in the up-down direction and respectively allow the 7-segment display devices 50*a* of the display part 50 to pass therethrough; and button-contact parts 44*b*, which are switchable between a contact state and a noncontact state for each of the button switches 52*a* of the manually operable parts 52.

The torque threshold display seal (transparent window) 46 comprises: display windows 46*a*, through which the respective 7-segment display devices 50*a* are viewable; and buttons 46*b* for switching (pushing) the button switches 52*a* via the button-contact parts 44*b*.

When one of the buttons 46*b* (e.g., the right button 46*b*) is pressed, the torque threshold-setting interface control part receives a corresponding signal, and the torque threshold-setting interface and display 40 enters into (initiates) a torque threshold-setting mode (more specifically, a torque threshold-setting unlocked state). For example, by flashing the right 7-segment display device 50*a* (or by displaying, e.g., an "S" or another letter, number or symbol on the right 7-segment display device 50*a*), the torque threshold-setting interface control part displays (indicates) that the torque threshold-setting mode has been initiated, i.e. the currently-set (stored) torque threshold value can be changed.

If the same (e.g., right) button 46*b* is pressed once again, then the torque threshold-setting interface control part ends the torque threshold-setting mode and thus enters into a torque threshold-setting locked state. In this torque threshold-setting locked state, the right 7-segment display device 50*a* can be, e.g., turned off or can display, e.g., an "L" or another letter, number or symbol, thereby indicating that the currently-set torque value is locked. Of course, the torque threshold-setting mode can be reinitiated by pressing the same button 46*b* again. It is noted that, if the same button 46*b* is not pressed again within a prescribed time (e.g., 60 seconds), the torque threshold-setting interface control part may optionally end the torque threshold-setting mode (and the display thereof) and automatically return to the torque threshold-setting locked mode.

In the torque threshold-setting mode, as shown in FIG. 7, the torque threshold-setting interface control part ascertains, using the magnetic field sensor 38, the orientation of the magnetic fields of the permanent magnets 28 of the dial 24 in accordance with the current rotational position of the dial 24.

Figure 7A:
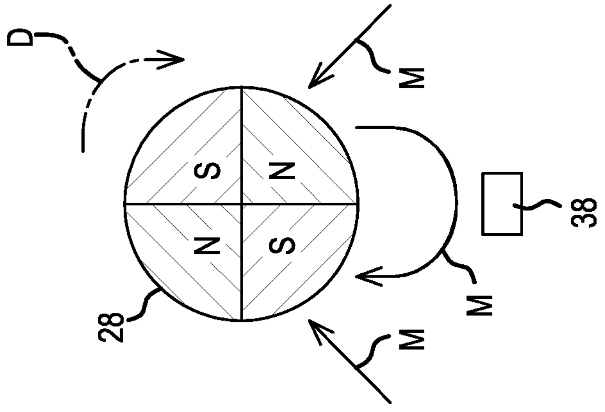
FIGS. 7A-D are schematic drawings respectively showing four rotational positions of the dial shown in FIG. 1 relative to a magnet field sensor.

As shown in FIG. 7A, at a first rotational position at which the N poles and the S poles are aligned in the up-down direction and the N poles are positioned at the upper front and the lower rear, the magnetic-force lines downward of the permanent magnet 28 exit from the rear-side N pole and travel around to the front-side S pole, as indicated by the curved arrow M in FIG. 7A. Thus, the magnetic field sensor 38 detects that the magnetic-force lines are currently extending from the rear side to the front side; i.e. the magnetic field sensor 38 detects a magnetic field in which the longitudinal magnetic field is zero and the transverse magnetic field is at its maximum value in the forward direction. Then, the magnetic field sensor 38 transmits a corresponding signal to the torque threshold-setting interface control part.

Figure 7B:
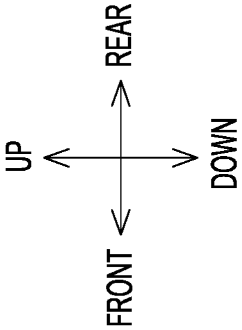
Figure 7B:
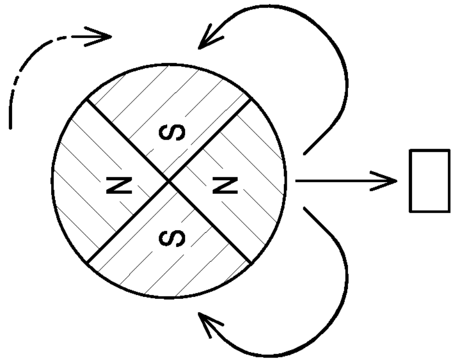

When the dial 24 is rotated from this state (first rotational position) by 45° in the direction of arrow D in FIG. 7A, the permanent magnets 28 arrive at a second rotational position at which the N poles are positioned in the up-down direction and the S poles are positioned in the front-rear direction, as shown in FIG. 7B. At this second rotational position, the magnetic-force lines downward of the permanent magnets 28 exit such that the magnetic field is directed toward the magnetic field sensor 38. Thus, the magnetic field sensor 38 detects the magnetic field with regard to these magnetic-force lines; i.e. the magnetic field sensor 38 detects a magnetic field in which the longitudinal magnetic field is at its maximum value in the downward direction and the transverse magnetic field is zero. Then, the magnetic field sensor 38 transmits a corresponding signal to the torque threshold-setting interface control part.

Figure 7C:
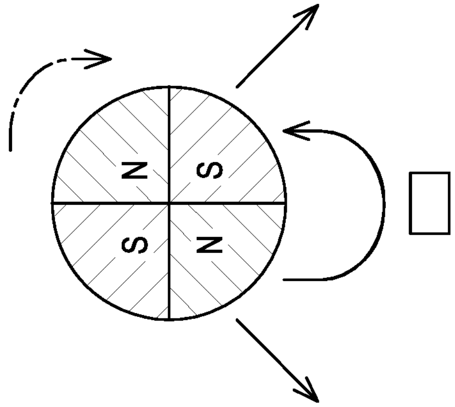

When the dial 24 is rotated further in the same direction, the permanent magnets 28 arrive at a third rotational position at which the N poles and the S poles are aligned in the up-down direction and the S poles are positioned at the upper front and the lower rear as shown in FIG. 7C. At this third rotational position, the magnetic-force lines downward of the permanent magnets 28 exit such they travel around from the front-side N pole to the rear-side S pole, and the magnetic field sensor 38 detects the magnetic field related to these magnetic-force lines; i.e. the magnetic field sensor 38 detects a magnetic field for which the longitudinal magnetic field is zero and the transverse magnetic field is at its maximum value in the rearward direction. Then, the magnetic field sensor 38 transmits a corresponding signal to the torque threshold-setting interface control part.

Figure 7D:
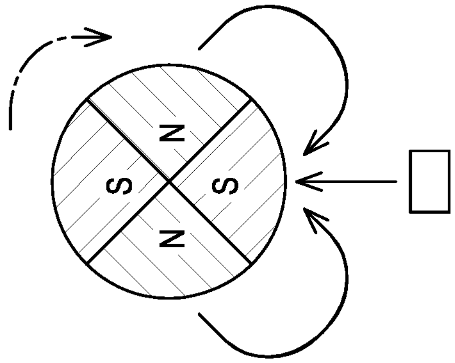

When the dial 24 is rotated further in the same direction, as shown in FIG. 7D, the permanent magnets 28 arrive at a fourth rotational position at which the S poles are positioned in the up-down direction and the N poles are positioned in the front-rear direction. At this fourth rotational position, the magnetic-force lines downward of the permanent magnets 28 pass such that they are directed from the magnetic field sensor 38 toward the permanent magnets 28. Thus, the magnetic field sensor 38 detects the magnetic field with regard to these magnetic-force lines; i.e. the magnetic field sensor 38 detects a magnetic field in which the longitudinal magnetic field is at its maximum value in the upward direction and the transverse magnetic field is zero. Then, the magnetic field sensor 38 transmits a corresponding signal to the torque threshold-setting interface control part.

When the dial 24 is rotated further in the same direction, the permanent magnets 28 arrive again at the first rotational position shown in FIG. 7A. Thus, the dial 24, which comprises the permanent magnets 28, undergoes a half rotation in FIGS. 7A-D. In addition, if the dial 24 is rotated in the reverse direction of arrow D, then the magnetic fields detected by the magnetic field sensor 38 change to the reverse of that in FIGS. 7A-D. Consequently, based on the rotational position detected by the magnetic field sensor 38 and the transition thereof, the torque threshold-setting interface control part can ascertain the rotation every 45° of the dial 24 as well as the direction of rotation.

Thus, in the torque threshold-setting mode, the torque threshold-setting interface control part changes the currently-set (stored) torque threshold for the motor 8 and communicates the updated torque threshold to the controller 20 so that the updated torque threshold is stored.

Figure 8:
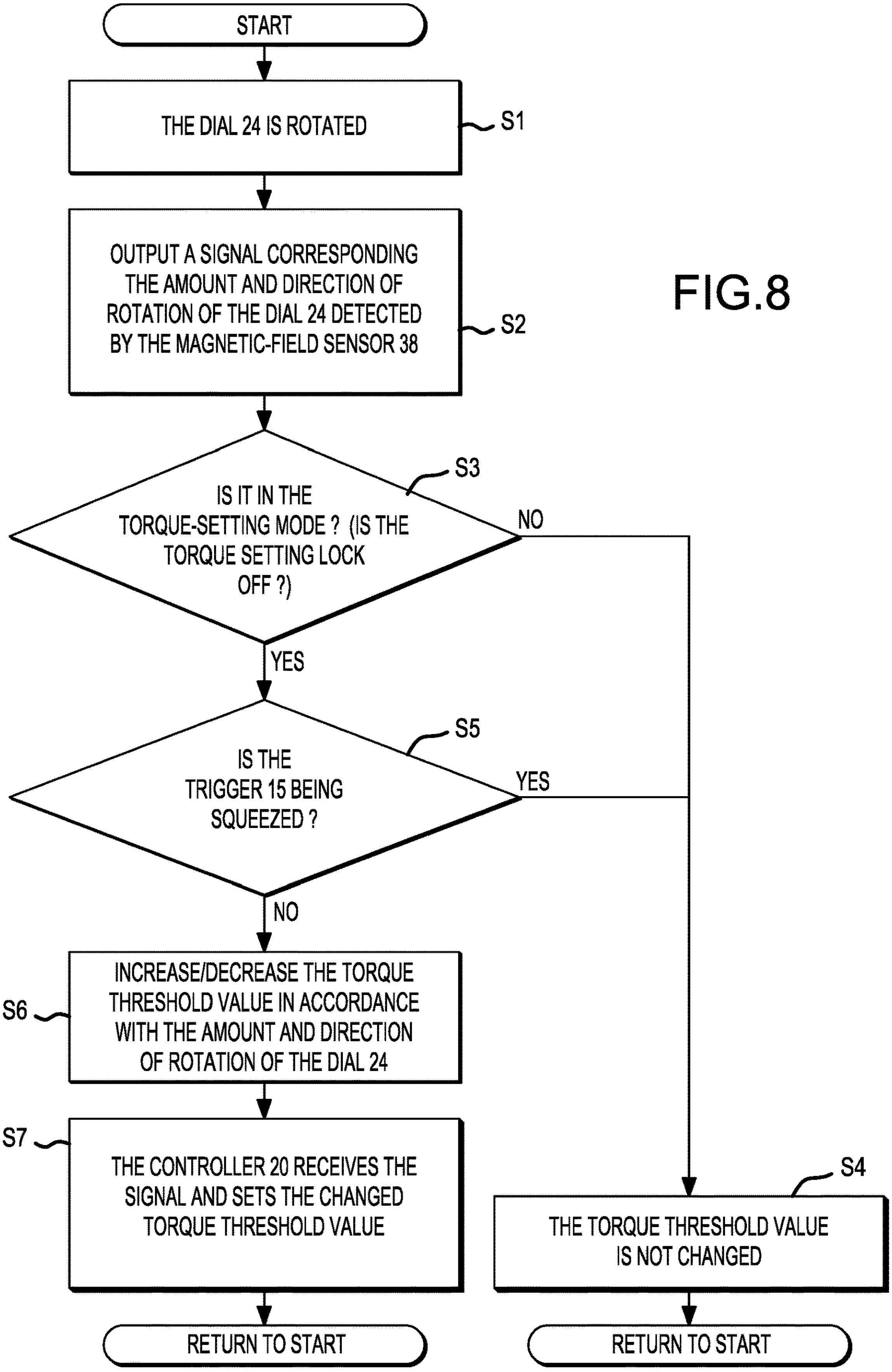
FIG. 8 is a flow chart that shows a representative algorithm for setting a torque threshold for stopping a motor.

A representative method (algorithm) for updating the set torque threshold is provided in the flow chart of FIG. 8. That is, when the dial 24 is rotated by a user (step S1), the magnetic field sensor 38 detects the amount of rotation and the direction of rotation of the dial 24 and outputs, to the torque threshold-setting interface control part, a signal in accordance with the detection result. That is, in the manner described with regard to FIGS. 7A-D, the torque threshold-setting interface control part ascertains the amount of rotation and the direction of rotation of the dial 24 (step S2).

Then, the torque threshold-setting interface control part determines whether the torque threshold-setting mode is currently set (YES) or whether the torque threshold-setting locked mode is currently sent (NO) (step S3). If the result of this determination is NO, then the torque threshold is not changed (step S4), even though the dial 24 has been rotated.

On the other hand, if the result of this determination is YES, then the torque threshold-setting interface control part further determines whether the trigger 15 is currently being pulled (is the switch 14 ON?) (step S5).

If the trigger 15 is being pulled (YES), then, to ensure stability of the operation of the motor 8, the torque threshold-setting interface control part does not change the torque threshold (step S4), even though the dial 24 has been rotated.

On the other hand, if the trigger 15 is not currently being pulled (NO), then the torque threshold-setting interface control part increases or decreases the currently-set torque threshold value in accordance with the amount of rotation and the direction of rotation of the dial 24 (step S6). In the present embodiment, up to 40 steps or 40 torque threshold values (corresponding to a range of 1 N·m to 45 N·m) are settable, with the smallest torque threshold serving as a first step (i.e. 1 newton meter or N·m). Therefore, when the dial 24 is rotated 45° in the direction in which the upper part of the dial 24 moves from the rear to the front, the step number of the torque threshold is reduced by one (however, not to zero or less). On the other hand, when the dial 24 is rotated 45° in a reverse direction thereof, the step number of the torque threshold is increased (however, not to 41 or more). The step number of the torque threshold value is displayed on the display part 50, e.g., using the left and center 7-segment display devices 50*a*.

It is noted that the above-described embodiment may be modified in various ways without departing from the scope and spirit of the present teachings. For example, in one alternate embodiment of the present teachings, the number of steps of the torque threshold (i.e. the total number of settable torque threshold values) may be 39 or less or 41 or more, e.g., any number between 5-100. In addition or in the alternative, the relationship between the step numbers and the torque thresholds may be set in various alternative ways. For example, instead of displaying a step number, the actual torque threshold (in N m) may be directly displayed on the display part 50, i.e. without use of a step number. Such an embodiment is easy to implement in embodiments, in which the display is a flat-panel display (e.g., an LCD). In the alternative, symbols (e.g., A, B, C, or the like) corresponding to the step numbers or the torque thresholds instead may be displayed on the display part 50. The relationship between the direction of rotation of the dial 24 and the increase/decrease in the step number of the torque threshold may be reversed. If the dial 24 is further rotated in the step-number increasing direction when the step number of the torque threshold is already at its maximum, then the torque threshold-setting interface control part may loop the step number to the minimum value or may loop the step number to the maximum value upon rotation of the dial 24 from the minimum value in the step-number decreasing direction.

Furthermore, the torque threshold-setting interface control part sends the torque threshold, which has been changed by being increased or decreased, to the controller 20 (the control circuit board 21). When the controller 20 receives the newly-set torque threshold, it changes (updates, sets) the stored torque threshold-setting (user-set torque threshold value) accordingly (step S7) and uses stored torque threshold in future operation of the motor 8 at least in a screwdriving mode of the power tool, as will be further explained below.

The rotational speed of the rotor 10 of the motor 8 is controlled by the controller 20 (the control circuit board 21) based, in part, on a variable input signal from the switch 14, i.e. the signal changes in correspondence to the amount that the trigger 15 has been pulled/squeezed so that the user can control the rotational speed of the motor 8 using the trigger 15 and the controller 20 controls the motor speed, e.g., according to a known pulse-width modulation (PWM) technique. Generally speaking, the more the trigger 15 is squeezed, the more current is supplied by the controller 20 to the motor 8, thereby increasing the rotational power applied to the rotor 10. As will be further described below, the controller 20 can also monitor the current supplied to the plurality of coils of the motor 8 in relation to the torque that is currently being applied to the drill chuck 6 and thus to the drill bit. Therefore, in the present embodiment, when the controller 20 determines that the torque, which is currently being applied to the drill chuck 6, has reached or exceeds the torque threshold corresponding to the current-set (stored) torque threshold, the controller 20 stops the rotation of the rotor 10, e.g., by cutting off the current supplied to the coils wound on the stator 9. The torque currently being applied to the drill chuck 6 can be determined based at least in part on an electric current value (A, ampere) detected by the controller 20. That is, the controller 20 is capable of monitoring the instantaneous electric-current value of the motor 8. Therefore, when the controller 20 detects that the instantaneous electric-current value (or an average or integrated value thereof) has reached or exceed an electric-current value corresponding the presently-set (stored) torque threshold, the controller 20 stops the rotation of the motor 8 by stopping the supply of current to the motor 8. It is noted that, in alternate embodiments of the present teachings, the controller 20 may store a correspondence between the torque threshold and a threshold other than the electric-current threshold and may stop the rotation of the motor 8 based thereupon.

Referring again to FIGS. 1 and 12, the gear assembly 12 comprises a multi-stage (three-stage) planetary-gear mechanism, which serves as the speed-reducing mechanism 12A. Each stage has: a plurality of planet gears; an internal gear that contains and meshes with the plurality of planet gears; and a carrier having shafts (pins) fixed thereto and respectively rotatably supporting the planet gears. It is noted that the gear assembly 12 may comprise a planetary-gear mechanism having one stage, two stages or more than three stages, and/or may comprise another type of speed-reducing mechanism.

A front-end portion of the motor shaft 10*a* has teeth (a pinion) that mesh (meshes) with the plurality of first-stage planet gears.

The second-stage internal gear is configured to be movable forward and rearward in the axial direction. More specifically, a speed change lever 60 is provided on an upper part of the rear housing 7 and is slidable in the front-rear direction. The speed change lever 60 is mechanically coupled to the second-stage internal gear via a coupling member (not shown).

When the speed change lever 60 is manually slid to its forward position and thereby moves the second-stage internal gear to its advanced (forward) position, the second-stage internal gear meshes with a coupling ring (not shown), which is held by the gear case 12C, and consequently the second-stage internal gear is blocked (prevented) from rotating. This results in a low-speed mode in which a second-stage speed reduction acts to reduce the rotational speed of the spindle 13 (while increasing torque).

On the other hand, when the speed change lever 60 is manually slid to its rearward position and thereby moves the second-stage internal gear to its rearward position, the second-stage internal gear meshes with the outer circumference of the first-stage carrier while maintaining the meshing with the second-stage planet gears. This results in a high-speed mode in which there is no second-stage speed reduction.

In addition, in the interior of the gear case 12C, a hammer mechanism 12B is provided radially outward of the spindle 13.

The spindle 13 is supported by front and rear bearings (not shown) held by the gear case 12C, and a rear-end portion thereof is coupled via a spline to a third-stage carrier.

In the hammer mechanism 12B, a first cam and a second cam, each of which has a ring shape, are externally mounted coaxially from the front between the front and rear bearings on the spindle 13. The first cam (not shown) has a cam gear on its rear surface and is mechanically fixed to the spindle 13. The second cam (not shown) has a cam gear on its front surface and is disposed such that it is nonrotatable in the state in which the second cam surrounds the spindle 13 inside the gear case 12C.

Furthermore, steel balls (not shown) are held, by a ring-shaped receiving plate, against the front bearing forward of the first cam. A cam plate (not shown) is provided between the balls and the first cam. In addition, an arm (not shown) extends rearward from the cam plate. The arm is coupled, via a coupling plate (not shown), to an action mode changing ring 62, which is mounted such that it is rotatable relative to a front outer side of the rear housing 7. By manually rotating the action mode changing ring 62 relative to the rear housing 7, the coupling plate rotates therewith. As a result of this relative rotation, the arm either engages the first cam with the second cam by sliding the first cam rearward via the cam plate, or releases the engagement of the first cam with the second cam by sliding the first cam forward via the cam plate.

With regard to the action modes, a first rotational position of the action mode changing ring 62 is a phase (configuration) in which the cam plate does not slide the first cam rearward. Therefore, the first cam is forward of the second cam and does not engage with the second cam. Consequently, a screwdriving mode results in which the spindle 13 does not hammer.

In the screwdriving mode, the rotation of the spindle 13 continues until the rotation of the motor 8 is stopped by the controller 20 owing to the torque threshold, which was input by the dial 24 and the magnetic sensor 38 to the controller 20 via the torque threshold-setting interface and display 40, having been exceeded, as was explained in the embodiment above.

To change to a hammer drilling mode (i.e. rotation with hammering), the action mode changing ring 62 is rotated by a prescribed angle from the first rotational position to a second rotational position. As a result, the cam plate slides the first cam rearward, thereby causing the first cam to engage the second cam, whereby the hammer mechanism 12B operates. When the spindle 13 is rotated in the hammer drilling mode, the first cam, which rotates integrally with the spindle 13, engages with the second cam held by the gear case 12C, and consequently hammering on the spindle 13 in the axial direction of the spindle 13 occurs in addition to the rotation of the spindle 13.

In this action mode (hammer drilling mode), the motor 8 and the spindle 13 rotates regardless of the torque threshold, i.e. the torque threshold (if any) set by the user is ignored.

However, it is noted that an electrical switch may be provided that turns ON at the second rotational position of the mode changing ring 62, and, when this switch turns ON, the controller 20 may be configured to not stop when the motor 8 exceeds the torque threshold in the hammer drilling mode. In addition, the power tool may be configured to operate in a drilling mode (rotation only with no torque threshold) at a third rotational position of the mode changing ring 62. That is, in the drilling mode, even if the instantaneous torque exceeds the currently-set (stored) torque threshold, the motor 8 continues to rotate the motor shaft 10*a*, because there is no need to stop the rotation of a drill bit in a drilling operation, unlike in a screwdriving operation. However, to ensure safety, etc., the motor 8 optionally may be stopped when the instantaneous torque becomes a specific (pre-set) torque or greater.

With the hammer driver-drill 1 of this type, when the switch 14 is turned ON by squeezing the trigger 15, the microcontroller of the controller 20 (the control circuit board 21) acquires the rotational position of the rotor 10 output from the sensor circuit board, controls the ON/OFF state of the switching devices in accordance with the acquired rotational position, and rotates the rotor 10 by sequentially supplying excitation current to the plurality of coils of the stator 9.

Consequently, the motor shaft 10*a* rotates, thereby causing the spindle 13 and the drill chuck 6 to rotate via the speed-reducing mechanism 12A in accordance with the action mode selected by the action mode changing ring 62. In this state, the rotating tool bit, which is mounted in the drill chuck 6, is pressed against a workpiece.

In at least the screwdriving mode, the microcontroller of the controller 20 (the control circuit board 21) monitors the current being supplied to the motor 8, which is proportional to the instantaneous torque being applied to the tool bit via the spindle 13 and the drill chuck 6. When the microcontroller determines that the instantaneous torque has reached or exceeds the set (stored) torque threshold because the monitored current has reached or exceed a corresponding electric current value, the microcontroller stops the rotation of the rotor 10 by simply cutting off the supply of current to the coils of the stator 9. As a result, the screw tightening (screwdriving) is stopped at, for example, a prescribed torque (i.e. the torque threshold set by the user by manually rotating the dial 24). In such an embodiment, it is not necessary to provide a mechanical clutch for stopping the rotation of the drill chuck 6 when the instantaneous torque being applied to the tool bit via the spindle 13 and the drill chuck 6 exceeds a torque threshold set by the user, thereby reducing part count and possibly increasing durability owing to the fact that there is no mechanical clutch that may wear out (break) as a result of extended usage. The weight and size of the power tool also may be reduced by eliminating the mechanical clutch.

When the fan 11A rotates together with the rotation of the motor shaft 10*a*, air is drawn in via the air-suction ports 11D in the side parts of the motor housing 7A. Because that airflow (draft) passes over the outer side and the inner side of the stator 9 (between the stator 9 and the rotor 10), and is discharged via the air-exhaust ports 11C in the side parts of the rear cover 11B, the motor 8 is cooled thereby.

In one aspect of the above-described embodiment, the hammer driver-drill 1 comprises, e.g., the motor 8; the motor housing 7A, which holds the motor 8; the grip housing 7B, which is connected to the motor housing 7A; the enlarged-part housing 7C, which is connected to the grip housing 7B; and the dial 24, which is provided on the enlarged-part housing 7C such that it is rotatable about the dial shaft 29. The motor 8 is controllable by the dial 24. For example, a torque threshold value for stopping operation of the motor 8 is settable by using the dial 24 to manually (rotatable) input the user's desired torque threshold.

Consequently, the hammer driver-drill 1 enables the user to change a torque threshold for controlling the operation of the motor 8 by turning (rotating) the dial 24 with one hand while grasping the grip part 3 with the other hand, thereby being more ergonomic than driver-drills having a torque-adjusting ring mounted adjacent to the drill chuck 6.

Furthermore, in another aspect of the above-described embodiment, the hammer driver-drill 1 comprises, e.g., the motor 8; the motor housing 7A, which holds the motor 8; the grip housing 7B, which is connected to the motor housing 7A; the battery mount housing (the enlarged-part housing 7C), which is connected to the grip housing 7B; and the dial 24, which is provided in the enlarged-part housing 7C and is rotatable about the dial shaft 29. A threshold for stopping the motor 8 is settable by the dial 24. Preferably, the threshold is an electric-current threshold related to the torque of the motor 8.

Consequently, in this hammer driver-drill 1, the torque threshold-setting operation (torque threshold setting) is easy to perform.

In particular, it is easier to manually rotate the dial 24 of the hammer driver-drill 1 of the present embodiment than the torque adjusting ring of known driver-drills that is mounted adjacent to the drill chuck 6.

That is, in the case of the manually operable ring of comparative examples, from the viewpoint of making the set value clear (to prevent the situation in which, when there are two or more set values, it becomes difficult to ascertain those set values at the same rotational position), when the set values are distributed over the rotational positions that span a maximum of one revolution, there is a theoretical limit to the division number (the step number) of the set value. Consequently, if the difference between the minimum value and the maximum value of the set values becomes large, the difference between adjacent set values becomes large, and it becomes difficult to finely adjust the set value. On the other hand, if the difference between the minimum value and the maximum value of the set values is made small, then despite the fact that the difference between adjacent set values becomes small, the torque threshold-setting range adversely becomes small. In addition, in the case of the manually operable ring in comparative examples, the diameter of the ring is comparatively large (i.e. compared to the dial 24), thereby requiring a commensurate (greater) force to manually rotate the manually operable ring.

In contrast, by providing the above-described dial 24 in the hammer driver-drill 1, the threshold value can be changed/set by changing (rotating) the rotational position of the dial 24. Therefore, a change in the set value can be differentiated even if the dial 24 rotates by two or more rotations, changing of the set value of multiple steps is easy, and, even if the difference between the minimum value and the maximum value of the set value becomes large, the torque threshold-setting range is ensured and the set value can still be set finely. In addition, because the diameter of the dial 24 can be made comparatively small, the dial 24 can be manipulated (manually rotated) using a smaller force.

In addition, the dial shaft 29 extends in a direction (the left-right direction) that intersects the direction in which the grip housing 7B extends (the up-down direction; the direction downward from the lower part of the main-body part 2). Consequently, it is easy to rotate the dial 24 with one hand while grasping the grip housing 7B with the other hand.

In addition, the dial 24 comprises the permanent magnets 28; the magnetic field sensor 38, which detects the magnetic field formed by the permanent magnets 28, is provided in the hammer driver-drill 1. Consequently, changes in the rotational position of the dial 24 can be ascertained simply by the magnetic field sensor 38. In addition, because the rotational position of the dial 24 is detected in a non-contacting manner, the magnetic field sensor 38 can be disposed inside a sealed part (the enlarged-part housing 7C). Consequently, the hammer driver-drill 1 has a structure that is designed to be dustproof and/or waterproof.

Furthermore, the permanent magnets 28 are arranged in the shape of a ring magnet. Consequently, the permanent magnets 28, using which the magnetic field sensor 38 can easily ascertain changes in the rotational position of the dial 24, are provided in a simple manner.

It is noted that the embodiments of the present invention are not limited to the above-mentioned embodiments and modified examples; for example, the following types of modifications to the above-mentioned embodiments and modified examples can be implemented as appropriate.

Instead of or in combination with the setting of the torque threshold value, the dial 24 and the controller 20 may be configured to the control the following functions of the motor 8: switching whether rotation-stop control is used based on the torque threshold being exceeded (switching between a screwdriving mode (i.e. auto-stop mode, in which the current to the motor is stopped when the currently-set torque threshold is reached) and a drill mode (i.e. the auto-stop function is disabled or turned OFF)); and setting a rotational speed threshold of the motor 8. When performing these functions, the currently-set set (stored) value or the mode need not be displayed on the display part 50. In addition, if the power tool according to the present teachings, such as the above-described hammer driver-drill, is configured to perform at least two from among: (i) switching between setting of the torque threshold and locking a previously-set (stored) torque threshold, (ii) use of rotation-stop control and (iii) setting of the rotational speed threshold, then the function that will be performed may be switched by manual operation (e.g., pressing) of one or more of the manually operable parts 52 (e.g., by pressing the center button **46*b***).

Instead of or in combination with the torque threshold, the threshold set by the dial 24 may be at least any one of a threshold related to the electric current of the motor 8, a threshold related to the rotational speed of the motor 8, and/or a threshold related to an integrated or average value of a plurality of measured current values or rotational speed values. In these alternate embodiments too, the instantaneous state may be displayed on the display part 50 as described above, and the function may be switched by pressing one or more of the manually operable parts 52.

The number of poles of the permanent magnet 28 (the diametrically magnetized ring magnet) is not limited to four (two N poles and two S poles); for example, the number of circumferentially alternating poles may be eight (four N poles and four S poles), the number of N poles and the number of S poles may differ, and the number of N poles and the number of S poles may be some other numbers.

The amount of torque being applied by the stator to the rotor (i.e. the motor torque) can be estimated by detecting (monitoring) the current value instantaneously being supplied to the coils of the stator. Then, the torque being applied to the tool accessory (output torque) can be calculated by multiplying the estimated motor torque (input torque) by the gear ratio of the speed-reducing mechanism (or, in the case of a multi-stage speed-reducing mechanism, by the effective gear ratio, which depends on the configuration of the multi-stage speed-reducing mechanism during the particular operation). In this regard, the output torque may be calculated based upon a single measured value, or based on a plurality of measured values. If a plurality of measured values is utilized in the calculation, then the measured values may be averaged or integrated over time, and the integrated or average value may be utilized. Preferably, the value utilized to determine the output torque for the purpose of determining when the currently-set torque threshold has been reached is based upon measurements taken after an inrush current (momentarily high current that typically results when the trigger is initially squeezed or moved during operation) has subsided, which may be, e.g., 100-200 milliseconds after a change in the position of the trigger is sensed.

In an exemplary embodiment for purposes of illustration of this concept, please assume that the (effective) gear ratio (mechanical advantage) of the speed-reducing mechanism is (set to) 50. In this case, the output torque applied to the tool accessory via the chuck will be 50 times greater than the input torque supplied by the rotor shaft. This also means that the rotor shaft will be rotating 50 times faster than the chuck (and thus the tool accessory as well).

Therefore, if the dial 24 has been rotated to set a torque threshold of 1 N·m (i.e. the currently-set torque threshold value, which is upper limit of the torque that will be applied to the tool bit via the chuck), then the controller can calculate the motor current value threshold that corresponds to 0.02 N·m applied to the motor shaft. Thus, when the controller detects that the instantaneous, average or integrated current value being supplied to the motor corresponds to a motor torque output of 0.02 N·m, the controller will stop the supply of current to the motor, thereby stopping the screwdriving operation without the need to use a mechanical clutch.

The controller can calculate the current threshold value in various ways.

For example, in one example, the motor output torque over a range of currents can be determined empirically by the manufacturer of the power tool. Then, a function or equation can be determined, such as $f(A)=T_m$, wherein A is the current in amperes and $T_m$ is the motor output torque (which will be the input torque to the speed-reducing mechanism). The output torque of the speed-reducing mechanism $T_O$ can be obtained by multiplying the input torque (motor output torque $T_m$) by the (effective) gear ratio R (or mechanical advantage) of the speed-reducing mechanism, such that the equation or function is simply $T_O=f(A)\cdot R$ or $T_O/R=f(A)$. This equation or function can then be stored in (programmed into) the controller for use during operation of the power tool according to the present teachings, such as the above-described hammer driver-drill.

Therefore, in such an embodiment, the controller can calculate the currently-set current threshold A from the output torque $T_O$, which has been input by the user rotating the dial 24.

In another example, a lookup table (LUT) may be generated by the manufacturer of the power tool to provide a correspondence between a plurality of currently-set current thresholds A and currently-set output torques $T_O$. Then, the controller need only access the LUT to identify the appropriate current threshold A for the currently-set torque threshold $T_O$.

If the speed-reducing mechanism is a multi-stage gear transmission, then one LUT may be generated for each (effective) gear ratio of the multi-stage gear transmission. In this example, the controller may be configured to receive an input each time the user changes the configuration of the multi-stage gear transmission, e.g., by manually manipulating the speed change lever 60. Then, the controller uses this input to select the LUT corresponding to the instantaneous (effective) gear ratio of the speed-changing mechanism for the purpose of determining the appropriate electric current value threshold (in accordance with the present configuration of the multi-stage speed-reducing mechanism) for stopping the supply of current to the motor.

Figure 9:
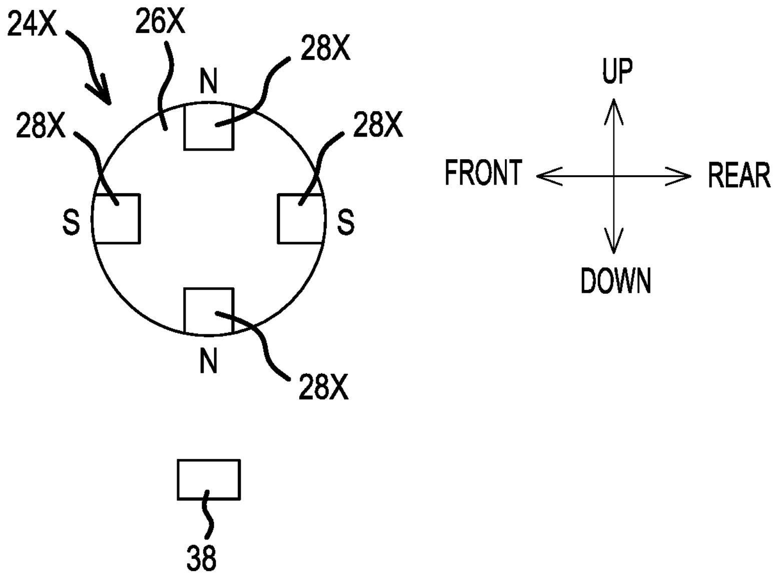
FIG. 9 is a schematic drawing of a longitudinal, center, cross section according to a modified exemplary example of the permanent magnets of the dial as compared to FIGS. 7A-D.

In another modified embodiment of the present teachings, as shown in FIG. 9, the permanent magnets 28 may instead be a plurality of discrete (non-contacting) plate magnets 28X, rather than being formed as a ring magnet that is continuously magnetized around the circumference of the ring.

In the modified embodiment shown in FIG. 9, a dial 24X comprises a columnar member 26X, which is made of resin (polymer, i.e. a rigid polymer) or the like, and a plurality of (e.g., four) plate magnets 28X, which are provided (e.g., at least partially embedded) on (in) an outer circumference thereof. The plate magnets 28X are disposed equispaced in the circumferential direction. In addition, the plate magnets 28X are disposed such that their poles that face radially outward alternate in the circumferential direction. In the rotational state (position) shown in FIG. 9, the N poles are disposed in the up-down direction and the S poles are disposed in the front-rear direction.

In this modified embodiment too, the same as with the ring magnet, detection of the rotational position of the dial 24X becomes possible using the magnetic field sensor 38.

It is noted that the number and arrangement of the plate magnets 28X can be modified in various ways, the same as with the ring magnet. In addition, the plate magnets 28X may protrude from the columnar member 26X or may be completely embedded in (completely enclosed within) the columnar member 26X. Furthermore, the columnar member 26X may be a tubular member, e.g., having a longitudinal center hole that receives a rotatable or fixed support shaft, e.g., similar to the shaft 29 of the first embodiment described above.

Figure 10:
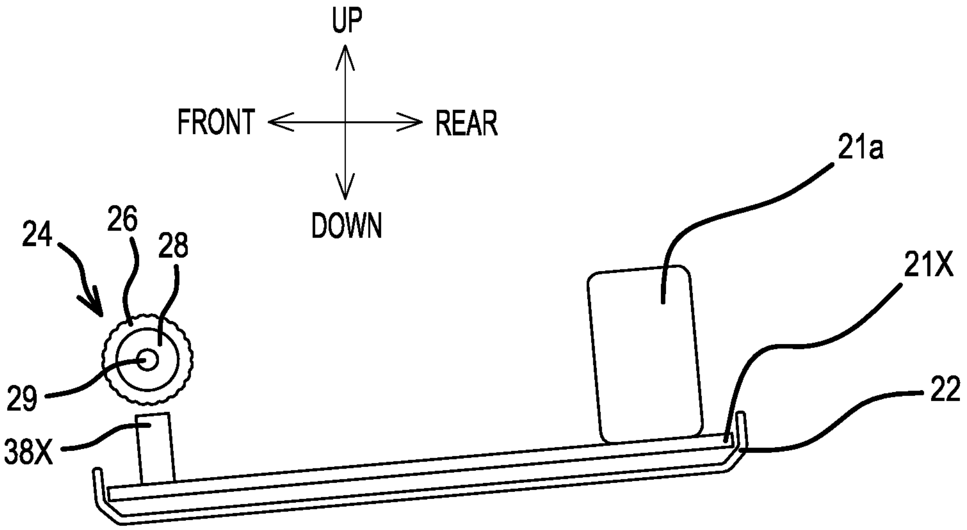
FIG. 10 is a schematic drawing of a longitudinal, center, cross section according to a modified exemplary example of the magnetic field sensor.

Furthermore, in another modified embodiment that is shown in FIG. 10, a magnetic field sensor 38X, which is adjacent to the dial 24, the same as with the magnetic field sensor 38, may be installed on a control circuit board 21X, the same as with the control circuit board 21. In this modified embodiment, the magnetic field sensor 38X is disposed in a compact manner, and the lead wires for the magnetic field sensor 38X may be omitted (i.e. the contacts of the magnetic field sensor 38X may be directly soldered to the control circuit board 21X), such that it is easy to electrically connect the magnetic field sensor 38X and the control circuit board 21X.

Figure 11:
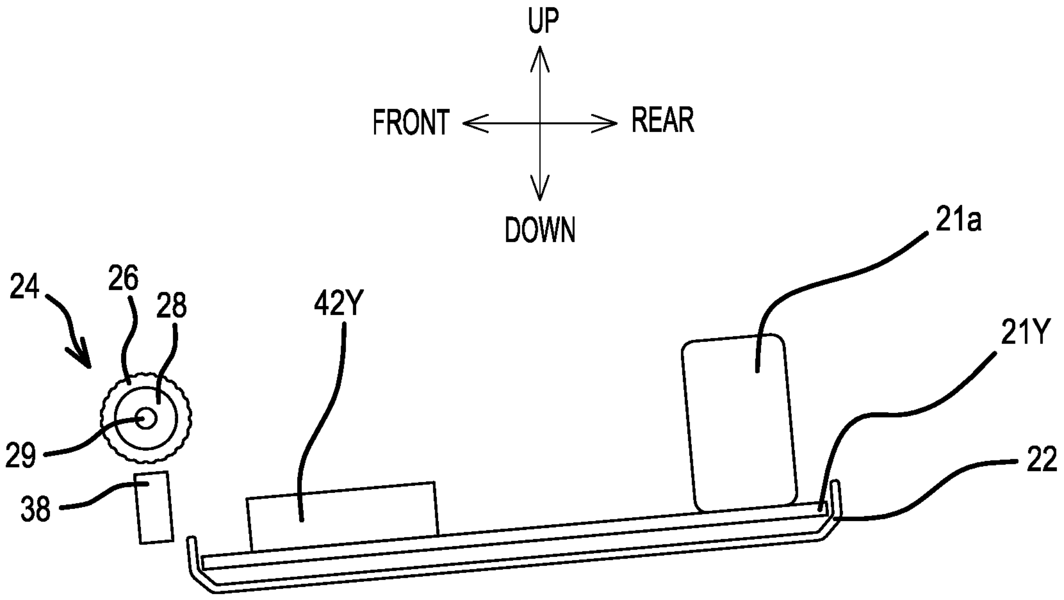
FIG. 11 is a schematic drawing of a longitudinal, center, cross section according to a further modified exemplary example of the magnetic field sensor.

In another modified embodiment that is shown in FIG. 11, a torque threshold-setting interface board 42Y, which is the same as the above-described torque threshold-setting interface board 42, may be installed directly on a control circuit board 21Y, which is the same as the control circuit board 21. In this modified embodiment, the torque threshold-setting interface board 42Y is disposed in a compact manner and the lead wires for the torque threshold-setting interface board 42Y may be omitted (i.e. the contacts of the torque threshold-setting interface board 42Y may be directly soldered to the control circuit board 21X and/or the components of the torque threshold-setting interface board 42Y and the components of the control circuit board 21X may be disposed on a single printed circuit board (PCB) and appropriately connected by printed conductive tracks/paths), such that it is easy to electrically connect the torque threshold-setting interface board 42Y and the control circuit board 21Y.

Furthermore, although not shown, both the magnetic field sensor 38X and the torque threshold-setting interface board 42Y may be both installed on a control circuit board.

Furthermore, instead of or in combination with the magnetic field sensor 38, the rotational position of the dial 24, 24X may be detected by an optical sensor and/or by a contact-type sensor.

Any type of lithium-ion battery having a rated voltage, e.g., of 14.4 V or 18 V (max. 20 V), or in the range of 18-36 V, such as 18 V, 25.2 V, 28 V, 36 V, can be used as the battery 18. Moreover, a lithium-ion battery having a rated voltage of a voltage that is less than 10.8 V or exceeds 36 V also can be used as the battery 18, and other types of batteries can also be used.

In addition, the present teachings can also be adapted to an angle power tool, wherein the direction of the output shaft (the tool-accessory retaining part) differs (typically by about) 90° from the axial direction of the drive-power part (at least one of the axial direction of the rotor shaft of the motor and/or the transmission direction of the mechanism (e.g., a gear mechanism) that transmits that rotational force). Furthermore, the present teachings can also be adapted to: other power tools that are not rechargeable (not battery driven), such as corded tools that are driven by a commercial power supply, such as a hammer driver-drill, a driver-drill in which the hammer mechanism 12B is omitted, an impact driver, a grinder, a circular saw, a hammer, or a hammer drill; gardening tools (outdoor power equipment), such as a cleaner, a blower, or a gardening trimmer; and the like.

Additional embodiments of the present teachings include, but are not limited to:

1. A power tool comprising: a motor; a motor housing that holds the motor; a grip housing connected to the motor housing; an enlarged-part housing connected to the grip housing; and a dial that is provided on the enlarged-part housing such that it is rotatable about a dial shaft; wherein the motor is controllable by the dial.

2. A power tool comprising: a motor; a motor housing that holds the motor; a grip housing connected to the motor housing; a battery mount housing connected to the grip housing; and a dial that is provided on the battery mount housing such that it is rotatable about a dial shaft; wherein a threshold, such as an output torque threshold, for stopping (cutting of the supply of current to) the motor is settable by the dial.

3. The power tool according to embodiment 2, wherein the threshold is an electric-current threshold related to the torque of the motor.

4. The power tool according to any one of embodiments 1-3, wherein the dial shaft extends in a direction that intersects a direction in which the grip housing extends.

5. The power tool according to any one of embodiments 1-4, wherein the dial comprises a magnet; and a magnetic field sensor that detects the magnetic field formed by the magnet is provided.

6. The power tool according to embodiment 5, wherein the magnet is a ring magnet.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present disclosure have been described in the context of a device, it is to be understood that these aspects also represent a description of a corresponding method, so that each block or component of a device, such as the controller 20, is also understood as a corresponding method step or as a feature of a method step. In an analogous manner, aspects which have been described in the context of or as a method step also represent a description of a corresponding block or detail or feature of a corresponding device, such as the controller 20.

Depending on certain implementation requirements, exemplary embodiments of the controller 20 of the present disclosure may be implemented in hardware and/or in software. The implementation can be configured using a digital storage medium, for example one or more of a ROM, a PROM, an EPROM, an EEPROM or a flash memory, on which electronically readable control signals (program code) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the controller 20, are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes using the electric motor 8 and other mechanical structures of the power tool.

Therefore, although some aspects of the controller 20 have been identified as "parts" or "units" or "steps", it is understood that such parts or units or steps need not be physically separate or distinct electrical components, but rather may be different blocks of program code that are executed by the same hardware component, e.g., one or more microprocessors.

EXPLANATION OF THE REFERENCE NUMBERS

1 Hammer driver-drill (power tool)
6 Drill chuck
7A Motor housing
7B Grip housing
7C Enlarged-part housing
8 Motor
12A Speed-reducing mechanism
20 Controller
24; 24X Dial
28 Permanent magnet (magnet, ring magnet)
28X Plate magnet (magnet)
29 Dial shaft
38 Magnetic field sensor

The invention claimed is:

1. A driver drill comprising:

a motor housing that holds an electric motor, an axis of rotation of a rotor of the electric motor extending in a front-rear direction of the driver drill;

a grip housing having an upper end connected to a lower part of the motor housing; and an enlarged-part housing connected to a lower end of the grip housing and being spaced from the motor housing in an up-down direction of the driver drill that is perpendicular to the front-rear direction, wherein:

the driver drill is shiftable between a setting unlocked state in which an electronically settable setting of the driver drill is changeable by an electric signal and a setting locked state in which the electronically settable setting of the driver drill is not changeable;

the electronically settable setting of the driver drill is a torque threshold setting;

the driver drill includes a torque-threshold-setting interface circuit board configured to set the torque threshold of the driver drill;

the electric signal is a torque input signal;

the driver drill is shiftable between the setting unlocked state and the setting locked state by electronically switching the torque-threshold setting interface circuit board between a torque-threshold-setting unlocked state in which the torque threshold setting of the driver drill is changeable in response to a receipt of the torque input signal and a torque-threshold-setting locked state in which the torque threshold setting of the driver drill is not changeable in response to the receipt of the torque input signal; and the torque-threshold-setting interface circuit board is configured to electronically switch from the torque-threshold-setting unlocked state to the torque-threshold-setting locked state after a predetermined time has elapsed from an initiation of the torque-threshold-setting unlocked state.

2. The driver drill according to claim 1, wherein:
the electric signal is produced by a movement of an input device; and
in the setting unlocked state, the movement of the input device changes the torque threshold setting of the driver drill and in the setting locked state the movement of the input device does not change the torque threshold setting of the driver drill.

3. The driver drill according to claim 2, wherein the torque-threshold-setting interface circuit board is configured to set the torque threshold to at least twenty different values.

4. The driver drill according to claim 2, further comprising:
a trigger disposed in the grip housing, the trigger being shiftable from an off state to an on state;
wherein the driver drill is configured to remain in the setting locked state while the trigger is in the ON state.

5. The driver drill according to claim 2, further comprising:
a button configured to switch the driver drill between the setting unlocked state and the setting locked state; and
a first display device configured to display a current torque;
wherein the button and the first display device are attached to the torque-threshold-setting interface circuit board.

6. The driver drill according to claim 2, wherein:
movement of the input device sends the electric signal to the torque-threshold-setting interface circuit board.

7. The driver drill according to claim 6, further comprising:
a button configured to switch the torque-threshold-setting interface circuit board between the torque-threshold-setting unlocked state and the torque-threshold-setting locked state; and
a first display device configured to display a current torque;
wherein the button and the first display device are attached to the torque-threshold-setting interface circuit board.

8. The driver drill according to claim 7, wherein the input device comprises a dial disposed frontward of the button and the first display device in the front-rear direction.

9. The driver drill according to claim 8, further comprising:
a motor control circuit board configured to control the electric motor, the motor control circuit board having a switch and a microcontroller;
wherein the motor control circuit board is electrically connected to the torque-threshold-setting interface circuit board by lead wires.

10. The driver drill according to claim 9, wherein the motor control circuit board is disposed below the torque-threshold-setting interface circuit board.

11. The driver drill according to claim 6, wherein the torque-threshold-setting interface circuit board is configured to set the torque threshold to at least twenty different values.

12. The driver drill according to claim 6, further comprising:
a trigger disposed in the grip housing, the trigger being shiftable from an off state to an on state;
wherein the torque-threshold-setting interface circuit board is configured to be electronically switched to, and remain in, the torque-threshold-setting locked state while the trigger is in the ON state.

13. A driver drill comprising:
a motor housing that holds an electric motor, an axis of rotation of a rotor of the electric motor extending in a front-rear direction of the driver drill;
a grip housing having an upper end connected to a lower part of the motor housing; and
an enlarged-part housing connected to a lower end of the grip housing and being spaced from the motor housing in an up-down direction of the driver drill that is perpendicular to the front-rear direction;
wherein:
the driver drill is shiftable between a torque-threshold-setting unlocked state in which an electronically settable torque threshold setting of the driver drill is changeable by an electric signal and a torque-threshold-setting locked state in which the electronically settable torque threshold setting of the driver drill is not changeable; and
the driver drill is configured to electronically switch from the torque-threshold-setting unlocked state to the torque-threshold-setting locked state after a predetermined time has elapsed from initiation of the torque-threshold-setting unlocked state.

14. The driver drill according to claim 13, including a first input device for changing the electronically settable torque threshold setting when the driver drill is in the torque-threshold-setting unlocked state and a second input device for shifting the driver drill between the torque-threshold-setting unlocked state and the torque-threshold-setting locked state.

15. The driver drill according to claim 14, wherein the first input device comprises a dial and the second input device comprises a button.

16. The driver drill according to claim 15, wherein the driver drill is configured such that, in the torque-threshold-setting unlocked state, rotation of the dial changes the electronically settable torque threshold setting, and in the torque-threshold-setting locked state, rotation of the dial does not change the electronically settable torque threshold setting.

17. The driver drill according to claim 16, further comprising:
a trigger disposed in the grip housing, the trigger being shiftable from an off state to an on state;
wherein the driver drill is configured to be electronically switched to, and remain in, the torque-threshold-setting locked state while the trigger is in the ON state.

18. A driver drill comprising:
a motor housing that holds an electric motor, an axis of rotation of a rotor of the electric motor extending in a front-rear direction of the driver drill;
a grip housing having an upper end connected to a lower part of the motor housing; and
an enlarged-part housing connected to a lower end of the grip housing and being spaced from the motor housing in an up-down direction of the driver drill that is perpendicular to the front-rear direction;
wherein:
the driver drill is shiftable between a drilling mode and a screwdriving mode,
the driver drill includes a torque-threshold-setting interface circuit board configured to set a torque threshold of the driver drill in response to receipt of a torque input signal when the driver drill is in the screwdriving mode,
in the screwdriving mode, the driver drill is shiftable between a setting unlocked state in which a torque threshold setting of the driver drill is changeable and a setting locked state in which the torque threshold setting of the driver drill is not changeable by electronically switching the torque-threshold setting interface circuit board between a torque-threshold-setting unlocked state in which the torque threshold setting of the driver drill is changeable in response to receipt of the torque input signal and a torque-threshold-setting locked state in which the torque threshold setting of the driver drill is not changeable in response to the receipt of the torque input signal, and in the drilling mode the torque threshold setting of the driver drill is fixed.

19. The driver drill according to claim 18, including a mode-changing ring, wherein the mode-changing ring in a first position selects the screwdriving mode of the driver drill and the mode-changing ring in a second position selects the drilling mode of the driver drill.

* * * * *